(12) United States Patent
Furuhashi

(10) Patent No.: US 6,906,989 B2
(45) Date of Patent: Jun. 14, 2005

(54) APPARATUS AND METHOD FOR SEARCHING FOR DEFECTIVE ADDRESS OF RECORDING MEDIUM

(75) Inventor: Shinobu Furuhashi, Shimotsuga-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 653 days.

(21) Appl. No.: 10/095,963

(22) Filed: Mar. 13, 2002

(65) Prior Publication Data

US 2002/0133485 A1 Sep. 19, 2002

(30) Foreign Application Priority Data

Mar. 16, 2001 (JP) ........................................ 2001-075965

(51) Int. Cl.⁷ ................................................ G11B 7/00
(52) U.S. Cl. .................. 369/53.17; 369/47.1; 369/59.1; 369/53.15; 369/53.42
(58) Field of Search ............................ 369/47.1, 47.14, 369/47.15, 47.22, 47.31, 53.1, 53.12, 53.15, 53.16, 53.17, 53.2, 53.41, 53.42, 59.1

(56) References Cited

U.S. PATENT DOCUMENTS

| | | | | |
|---|---|---|---|---|
| 4,434,487 A | * | 2/1984 | Rubinson et al. ............. | 360/53 |
| 5,319,627 A | * | 6/1994 | Shinno et al. ........... | 369/53.17 |
| 6,167,461 A | * | 12/2000 | Keats et al. ............. | 360/77.08 |
| 6,249,884 B1 | | 6/2001 | Joo | |

* cited by examiner

Primary Examiner—Muhammad Edun
(74) Attorney, Agent, or Firm—Oblon, Spivak, McClelland, Maier & Neustadt, P.C.

(57) ABSTRACT

An apparatus for searching for defective address of recording medium includes a recording unit, a converter, and a comparator. The recording unit is configured to record a defect list recorded in an recording medium using physical addresses. The defect list includes defective addresses indicating the addresses of defects present in the recording medium, and the defective addresses are described using physical addresses. The converter is configured to convert a request address received in an access command to the recording medium from a logical address to a physical address. The comparator is configured to compare the defective address in the defect list recorded in the recording unit with the request address that has been converted into the physical address. A defective address present immediately after the request address is searched for on the basis of the comparison result of the comparator.

13 Claims, 15 Drawing Sheets

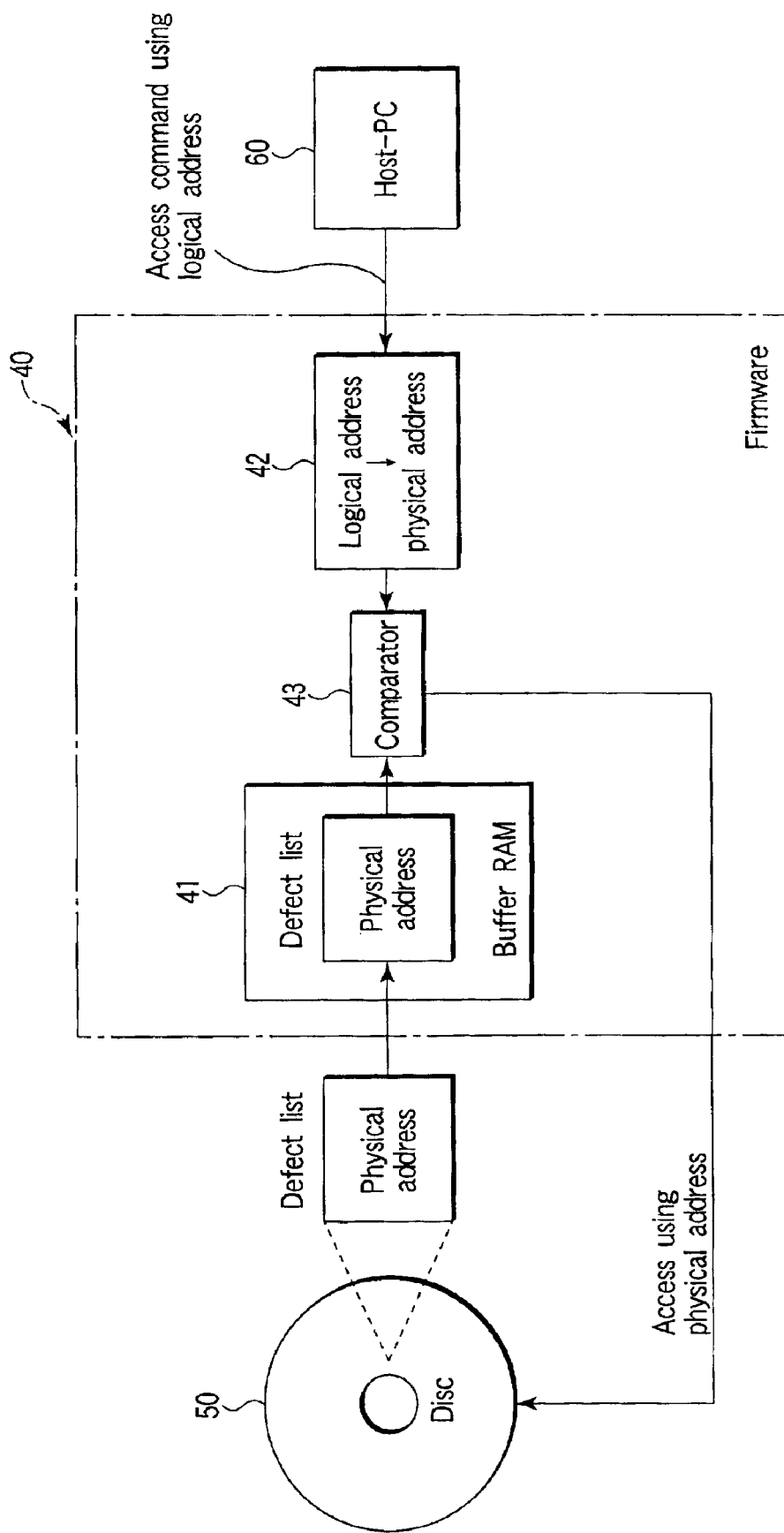
F I G. 2A

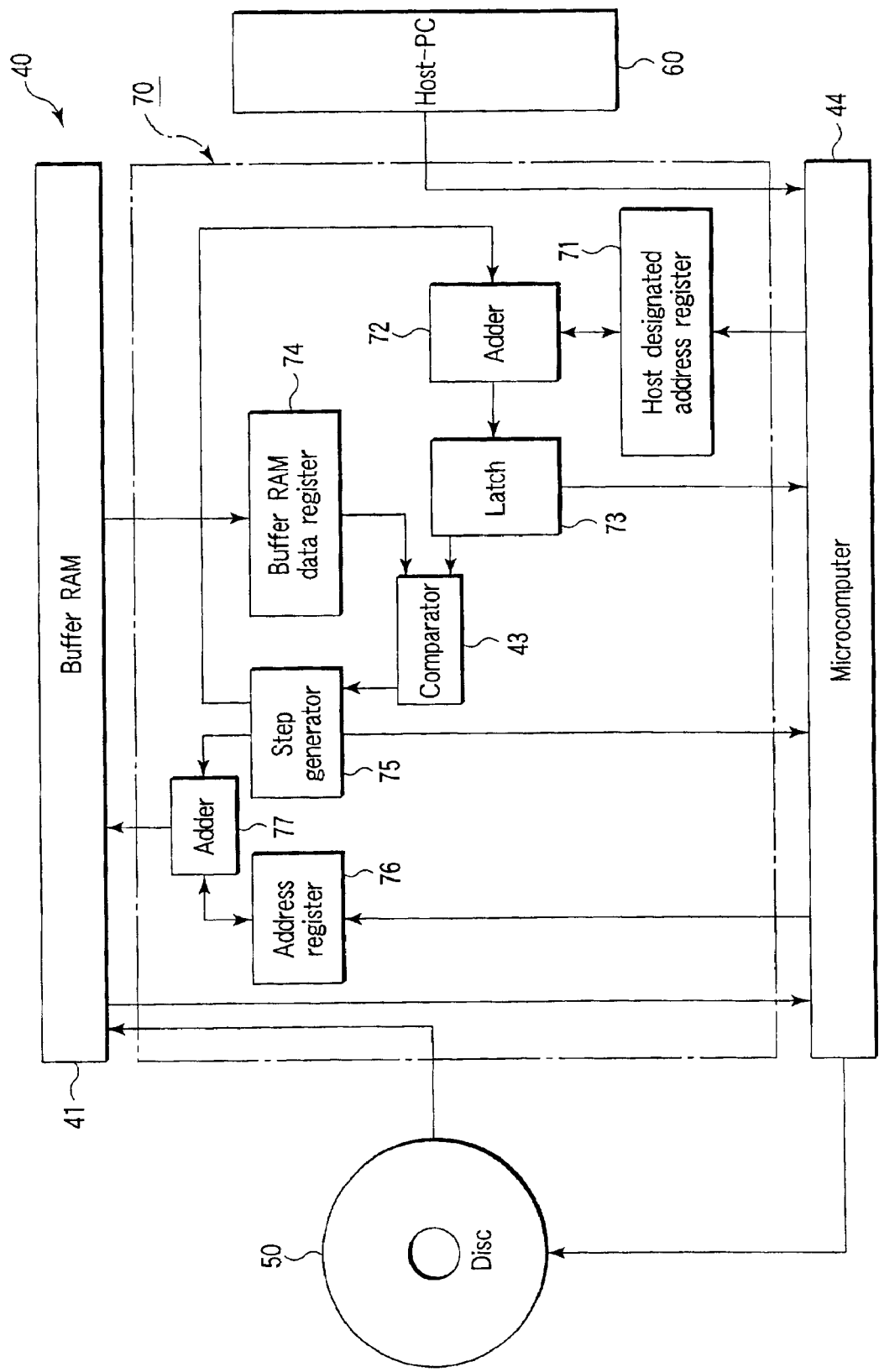
F I G. 2B

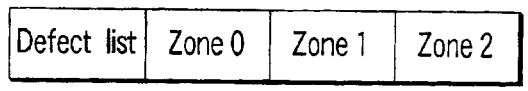
FIG. 4A
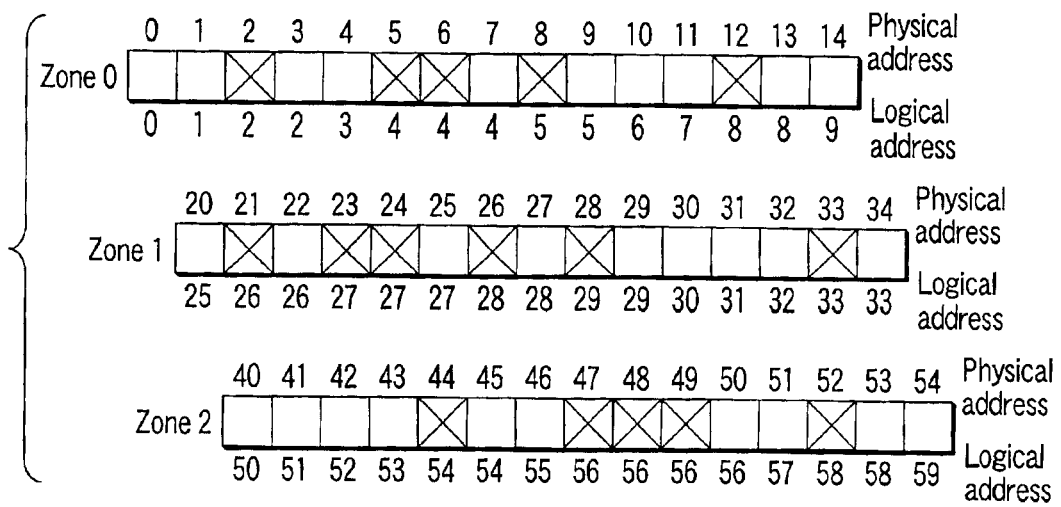
FIG. 4B
FIG. 4C

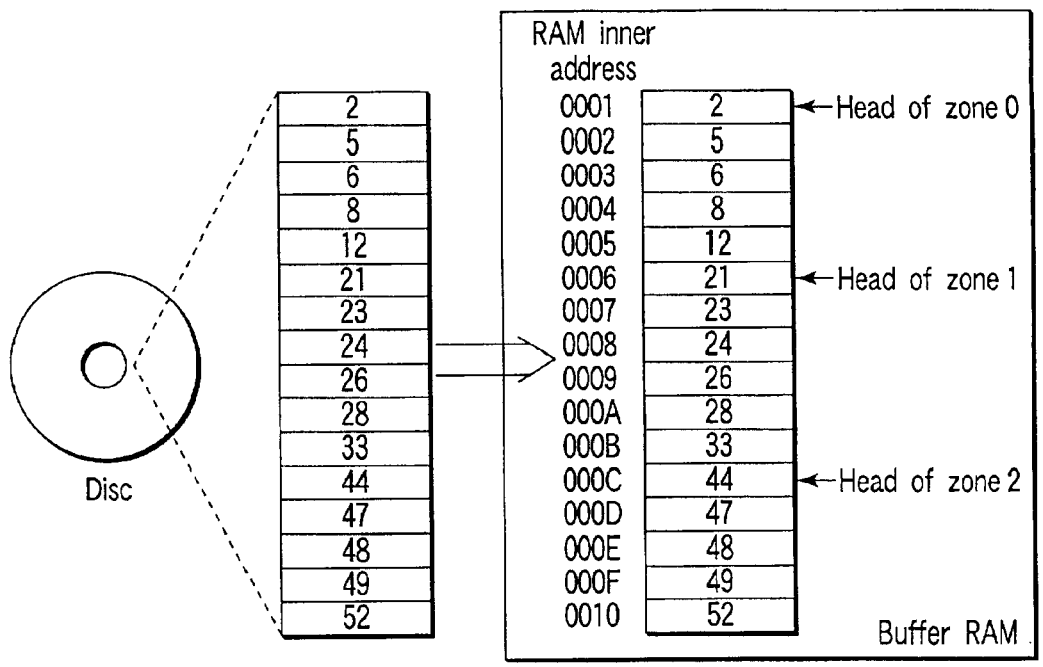
FIG. 6
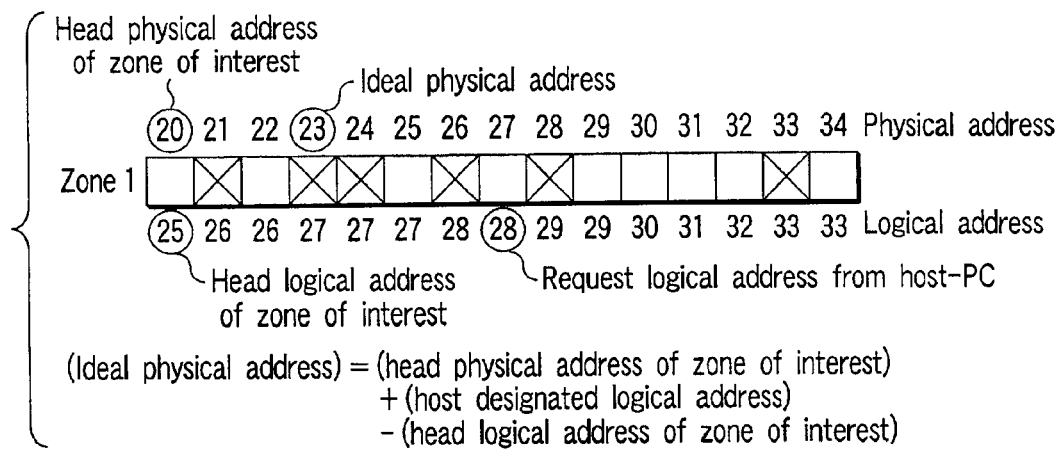
FIG. 7A
FIG. 7B

∴Reproduction start physical address is present within range from S619 to S620, and its address is "Dq"

| Number of entries | Defective address |
|---|---|
| 0 | 2 |
| 1 | 10 |
| 2 | 15 |
| 3 | 16 |
| 4 | 17 |
| 5 | 25 |
| 6 | 32 |
| 7 | 40 |
| 8 | 43 |
| 9 | 55 |
| 10 | 57 |
| 11 | 61 |
| 12 | 64 |
| 13 | 67 |
| 14 | 75 |
| 15 | 80 |
| 16 | 85 |
| 17 | 89 |
| 18 | 93 |
| 19 | 96 |
| 20 | 105 |
| 21 | 120 |
| 22 | 125 |
| 23 | 127 |
| 24 | 128 |
| 25 | 131 |
| 26 | 135 |
| 27 | 138 |
| 28 | 139 |
| 29 | 145 |
| 30 | 147 |
| 31 | 155 |
| 32 | 163 |

Head physical address="0"
Head logical address="10"
Request logical address from host-PC="130"
Ideal physical address="120"

FIG. 11

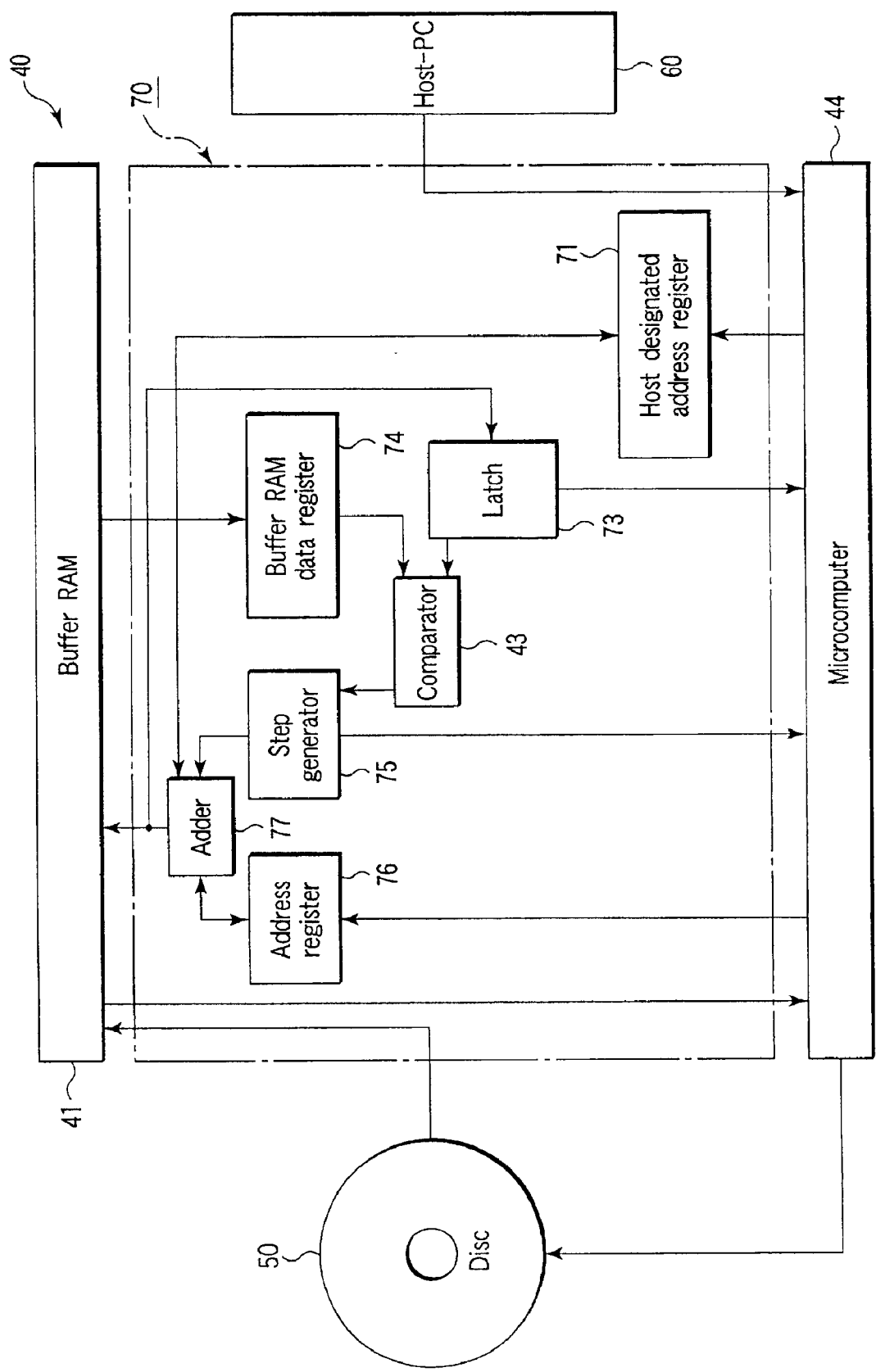
F I G. 16

APPARATUS AND METHOD FOR SEARCHING FOR DEFECTIVE ADDRESS OF RECORDING MEDIUM

CROSS-REFERENCE TO RELATED APPLICATIONS

This application is based upon and claims the benefit of priority from the prior Japanese Patent Application No. 2001-075965, filed Mar. 16, 2001, the entire contents of which are incorporated herein by reference.

BACKGROUND OF THE INVENTION

1. Field of the Invention

The present invention relates to a defect search method for managing a defect list using a physical address and, more particularly, to a technique for searching for a defective region present in a disk upon reproduction/recording of a recording medium such as a DVD-RAM (Digital Versatile Disc-Random Access Memory) or the like.

2. Description of the Related Art

A DVD-RAM suffers defects and scratches formed in the manufacture, and defects formed by deterioration due to repetitive use. For this reason, a defect management system for managing such defects is required. By adopting a defect management system, the reliability of recorded data can be maintained high even when a disc suffers defects.

As one of defect management systems, a scheme for assuring a defect list that describes defective addresses in a disc is known. This scheme searches for defective sectors/blocks based on the defect list. Then, a defective region is skipped, and a normal sector/block after the skipped region is used.

The defect list recorded in the disc is normally described using serial physical addresses that start from the inner periphery of the disc. On the other hand, a host-PC that issues a read/write command of the disc accesses the disc using logical addresses. The logical addresses are serial addresses which exclude defective sectors and blocks. For this reason, in order to search for defects in the disc, the defective addresses in the defect list must be converted from physical addresses into logical addresses, and the request address must then be collated with these logical addresses.

A conventional apparatus and method for searching for a defective address of a recording medium will be described below using FIG. 1. FIG. 1 is a block diagram showing a model of a conventional apparatus for searching for a defective address of a recording medium.

As shown in FIG. 1, firmware 10 has a buffer RAM 12, first converter 11, second converter 14, and comparator 13.

The first converter 11 reads out a defect list recorded in a disc 20. The first converter 11 then converts defective addresses contained in the defect list from physical addresses into logical addresses. The buffer RAM 12 stores the defect list that contains defective addresses which have been converted into logical addresses by the first converter 11. The comparator 13 compares the defect list stored in the buffer RAM 12 with a logical address requested from a host-PC 30. The second converter 14 converts the logical address obtained by the comparator 13 into a physical address to access the disc 20.

In this way, the defective addresses in the defect list recorded in the disc 20 are physical addresses, and a request address from the host-PC 30 is a logical address. For this reason, these addresses cannot be directly compared. Hence, after the defective addresses are converted from physical addresses into logical addresses, the request address is compared with the defective logical addresses.

However, this conversion process is a heavy load on the firmware 10. This is because the defective addresses are read out from the defect list, and must be skipped during reproduction/recording. For this reason, not only a reproduction/recording start address but also all subsequent addresses must be converted from logical addresses into physical addresses.

The above method suffices to manage primary defects formed in the manufacture. However, defect management must be done not only for primary defects but also for secondary defects. The secondary defects are those caused by, e.g., deterioration of a disc in use. Every time a secondary defect is generated, it is replaced by the normal block. However, once all the defective addresses in the defect list are converted into logical addresses, the secondary defect cannot be coped with. For this reason, another defect list described using physical addresses must be independently stored in the buffer RAM 12 so as to search for primary defects in the block replaced due to secondary defects. That is, the buffer RAM 12 must store two defect lists described in physical and logical addresses. As a result, a large-capacity buffer RAM 12 is required.

BRIEF SUMMARY OF THE INVENTION

An apparatus for searching for defective address of recording medium according to an aspect of the present invention comprises:

a recording unit configured to record a defect list recorded on an recording medium using a physical address, the defect list including defective addresses indicating addresses of defects present in the recording medium, and the defective addresses being described using physical addresses;

a converter configured to convert a request address received in an access command to the recording medium from a logical address into a physical address; and a comparator configured to compare the defective address in the defect list recorded in the recording unit and the request address that has been converted into the physical address, the defective address present immediately after the request address being searched based on a comparison result in the comparator.

A method for searching for defective address of recording medium according to an aspect of the present invention comprises:

converting a request address received in an access command to an recording medium from a logical address into a physical address;

comparing the request address that has been converted into the physical address with a defective address included in a defect list recorded in the recording medium, the defective address being described using a physical address; and searching for a defective address present immediately after the request address on the basis of a comparison result between the request address and the defective address.

BRIEF DESCRIPTION OF THE SEVERAL VIEWS OF THE DRAWING

FIG. 2A is a notional block diagram of an apparatus and method for searching for a defective address of a recording medium according to the first embodiment of the present invention;

FIG. 2B is a block diagram of an apparatus for searching for a defective address of a recording medium according to the first embodiment of the present invention;

FIG. 4A is a schematic diagram of a memory space of a DVD;

FIG. 4B is a schematic diagram of a zone in the memory space of the DVD;

FIG. 4C is a schematic diagram of a defect list in the memory space of the DVD;

FIG. 6 shows a state wherein the defect list in the DVD is read out by the method for searching for a defective address of a recording medium according to the first embodiment of the present invention;

FIG. 7A is a schematic diagram of a zone in a memory space of a DVD;

FIG. 7B is a schematic diagram of a defect list in the memory space of the DVD;

FIG. 11 is a schematic diagram showing a structure of a defect list;

FIG. 16 is a block diagram of an apparatus for searching for a defective address of a recording medium according to a modification of the first to fifth embodiments of the present invention.

DETAILED DESCRIPTION OF THE INVENTION

Figure 1:
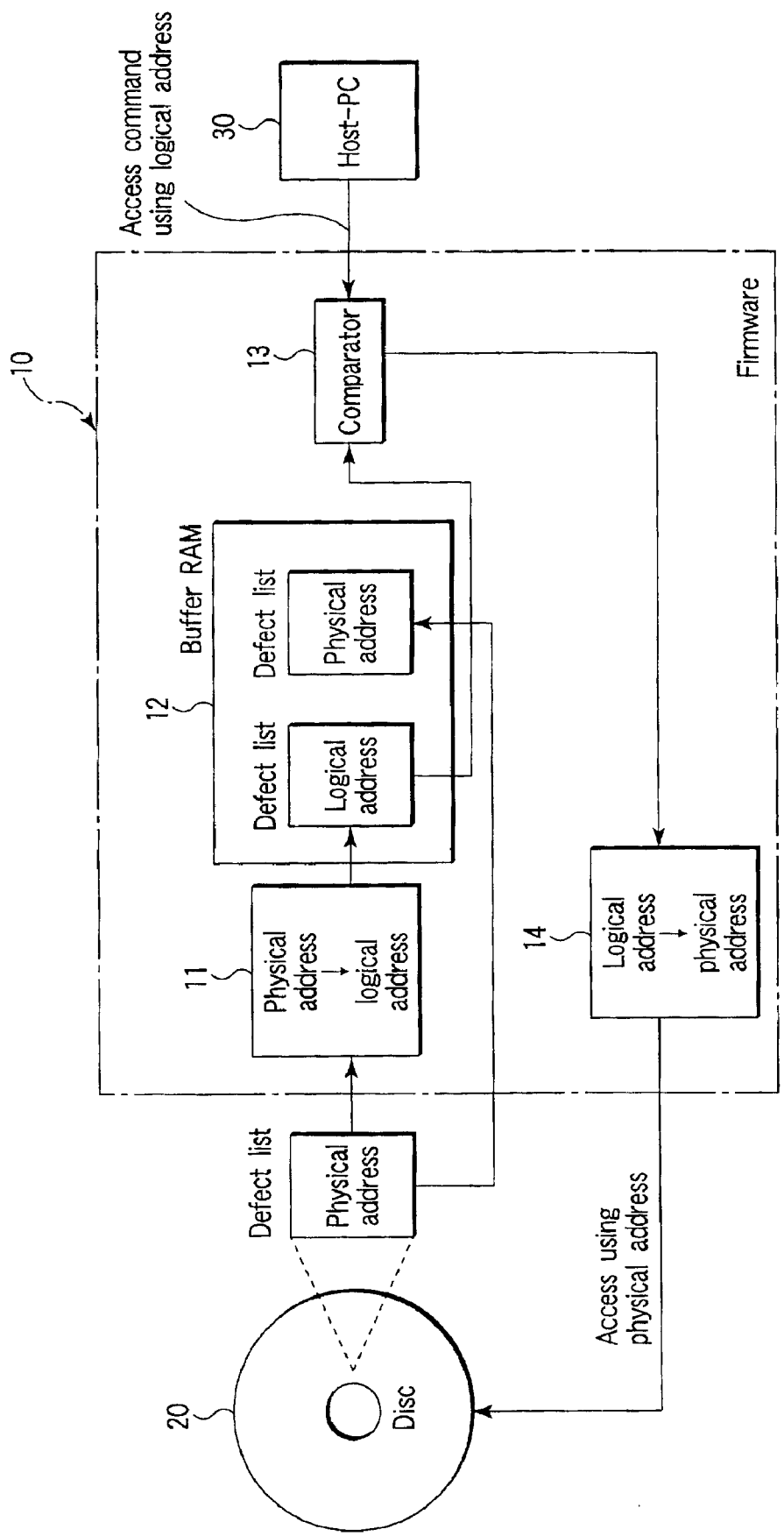
FIG. 1 is a notional block diagram of a conventional apparatus and method for searching for a defective address of a recording medium.

An apparatus and method for searching for a defective address of a recording medium according to the first embodiment of the present invention will be described below using FIG. 2A. FIG. 2A is a notional block diagram of a disc reproduction/recording apparatus.

As shown in FIG. 2A, the disc reproduction/recording apparatus comprises firmware 40 and a host-PC 60. The firmware 40 has a buffer RAM 41, converter 42, and comparator 43.

The buffer RAM 41 records a defect list written in a disc (DVD) 50. The defect list in the DVD 50 is described using physical addresses. The buffer RAM 41 records the defect list described using physical addresses.

The converter 42 converts a logical address into a physical address. Upon reproduction of the disc 50, the host-PC 60 inputs a reproduction (or recording) start address (request address) to the firmware 40. On the other hand, the defect list stored in the buffer RAM 41 is described using physical addresses. For this reason, these addresses cannot be directly compared. Hence, the converter 42 converts the request address from the host-PC 60 from a logical address into a physical address.

The comparator 43 compares the defect list and the request address that has been converted into a physical address to obtain the number of defects present before the request address. At the same time, the comparator 43 calculates a physical address corresponding to the request address received from the host-PC 60. The comparator 43 accesses the disc 50 using that physical address.

The apparatus and method for searching for a defective address of a recording medium will be described in more detail below using FIG. 2B. FIG. 2B is a block diagram of the disc reproduction/recording apparatus.

As shown in FIG. 2B, the firmware 40 has the buffer RAM 41, a decoder IC 70, and a microcomputer 44. The buffer RAM 41 records various data such as data read out from the DVD 50 and the like. The microcomputer 44 executes various processes based on commands from the host-PC 60. The decoder IC 70 has a host designated address register 71, an adder 72, a latch circuit 73, a buffer RAM data register 74, the comparator 43, a step generator 75, an address register 76, and an adder 77.

The host designated address register 71 holds a target address. The target address is generated by the microcomputer 44 on the basis of an ideal physical address of the request address received from the host-PC 60. Note that the ideal physical address and target address will be described later.

The adder 72 adds a step value generated by the step generator 75 to the target address held in the host designated address register 71.

The latch circuit 73 latches the target address added with the step value by the adder 72.

The comparator 43 compares the target address latched by the latch circuit 73 with a defective address held in the buffer RAM data register 74. The defective address is described using a physical address.

The step generator 75 generates a step value based on the comparison result of the comparator 43. The generator 75 outputs the step value to the adders 72 and 77 and the microcomputer 44.

The address register 76 operates based on a command from the microcomputer 44. The address register 76 holds the address of a region in the buffer RAM where defective addresses are recorded. The address held in the address register 76 will be referred to as a buffer RAM inner address hereinafter.

The adder 77 adds the step value generated by the step generator 75 to the buffer RAM inner address held in the address register 76. The adder 77 then outputs the sum to the buffer RAM 41.

The buffer RAM data register 74 holds a defective address recorded at the buffer RAM inner address equal to the sum output from the adder 77 in the buffer RAM.

Figure 3A:
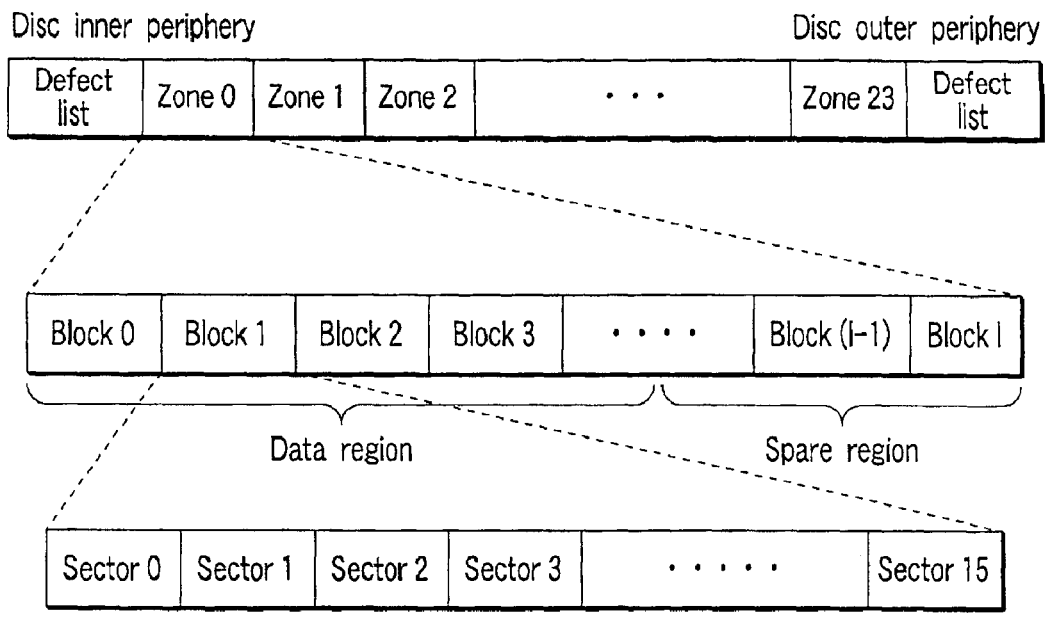
FIG. 3A is a schematic diagram of a memory space of a DVD.
Figure 3B:
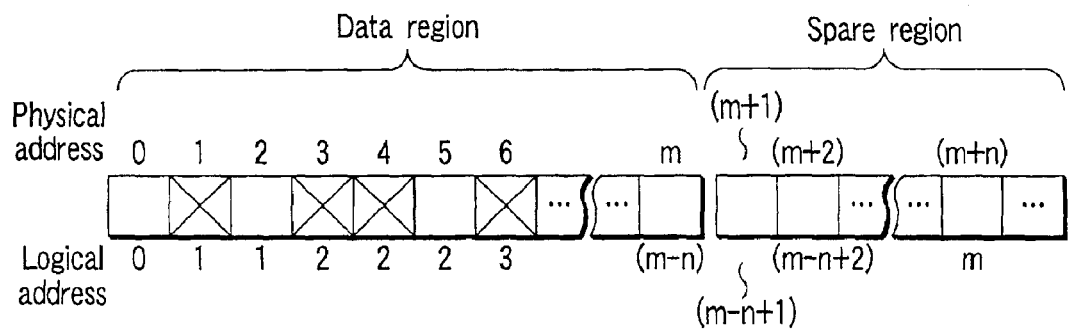
FIG. 3B is a schematic diagram of a zone in the memory space of the DVD.
Figure 3C:
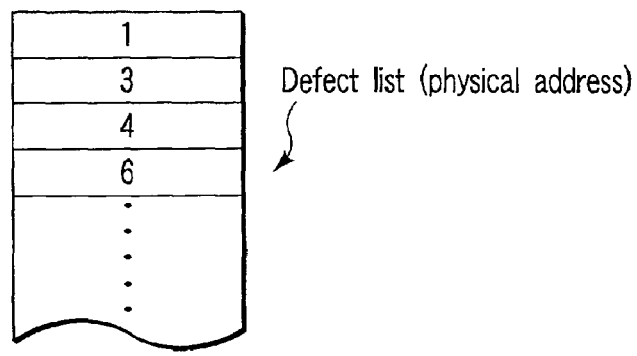
FIG. 3C is a schematic diagram of a defect list in the memory space of the DVD.

The structure of a memory space in the DVD will be described below using FIGS. 3A to 3C. FIG. 3A is a schematic diagram of the memory space of the DVD, FIG. 3B shows the detailed structure in one zone, and FIG. 3C shows an example of a defect list corresponding to FIG. 3B. Note that this embodiment exemplifies a DVD having a storage capacity of 2.65 Gbytes per side.

As shown in FIG. 3A, the memory space of the DVD contains 24 regions called zones, and regions which are assured on the inner and outer peripheries of the disc and record a defect list. Each zone has a plurality of blocks 0 to 1 (1: integer), and is roughly divided into two regions, i.e., a data region and spare region. The data region is a memory space normally used to record data, and the spare region is a memory space which is used in place of the data region if any defect is present in the data region. Each block has 16 sectors 0 to 15 each having a memory size of 2064 bytes.

The detailed structure of the zone will be explained below using FIGS. 3B and 3C. Note that defects in this case are primary defects formed in, e.g., the manufacture.

One zone has a data region and spare region. Assume that the number of sectors in the data region is m+1 (m: integer). In the data region, serial physical addresses 0 to m (m: integer) are assigned for respective sectors. If a sector that contains any defect (defective sector) is present, that sector is not used, and the next normal sector is used. Respective normal sectors are assigned logical addresses in turn. Hence, if defective sectors are present before the sector of interest, the logical address shifts backward in correspondence with the number of defective sectors.

In the example shown in FIG. 3B, sectors with physical addresses "1", "3", "4", and "6" suffer defects. These sectors are not used. Hence, the next normal sectors are used instead. For example, as for a sector with physical address "1", the next normal sector with physical address "2" is used instead. This alternative sector is assigned logical address "1". The physical address of the next sector to be used is "3", but this sector also suffers a defect. Hence, the next sector (sector with physical address "4") is to be used instead. However, since this sector suffers a defect, the second next sector (sector with physical address "5") is used instead. Then, logical address "2" shifts to the sector with physical address "5". As a result, three sectors with physical addresses "3" to "5" are assigned logical address "2". Since a sector with physical address "5" is normal, this sector is used. However, since the next sector with physical address "6" suffers a defect, the logical address of sectors up to the next normal sector becomes "3".

Logical addresses are assigned by numbering as mentioned above. Hence, the logical address of a sector corresponding to last physical address m of the data region is "(m−n)" if the total number of defects in the data region is n. Data for these n defects are compensated for by the spare region. That is, assume that sectors in the spare region are free from any defects. Hence, all data in the zone of interest are stored in sectors up to a sector with physical address "(m+n)" in the spare region. The logical address of this last sector is "m".

At this time, the defect list recorded in the disc is as shown in FIG. 3C. As shown in FIG. 3C, the defect list describes the physical addresses of sectors which suffer defects in turn. These defective addresses are not separated for, e.g., respective zones, but are recorded in turn from zone 0. Note that it is a common practice to determine the physical and logical addresses of the head sector of each zone in advance by the specifications of each DVD.

The method for searching for a defective address of a recording medium according to this embodiment will be described below. In the specifications of an actual DVD, for example, the number of zones is 24, and the memory size is 2.65 Gbytes. However, in this embodiment, a description will be given taking a model of a simplified memory space shown in FIGS. 4A to 4C as an example for the sake of simplicity.

FIG. 4A shows the memory space of a DVD, FIG. 4B shows a memory space in each zone, and FIG. 4C shows the structure of a defect list.

This embodiment assumes a disc having a memory space that includes a defect list assured on the inner periphery side of the disc, and three zones 0 to 2, as shown in FIG. 4A. Also, each zone is made up of 15 sectors, as shown in FIG. 4B.

The structure of zone 0 will be explained first. This zone has a head physical address="0" and a head logical address= "0". Sectors with physical addresses "2", "5", "6", "8", and "12" suffer defects (the number of defects=5).

Zone 1 has a head physical address="20", and a head logical address="25". Sectors with physical addresses "21", "23", "24", "26", "28", and "33" suffer defects (the number of defects=6).

Furthermore, zone 2 has a head physical address="40" and a head logical address="50". Sectors with physical addresses "44", "47", "48", "49", and "52" suffer defects (the number of defects=5).

The defect list of the disc with the above structure is as shown in FIG. 4C. As shown in FIG. 4C, the physical addresses of sectors that suffer defects are described in turn from zone 0 to zone 2.

The method for searching for defective addresses of the disc with the above structure will be explained below using the flow chart in FIG. 5.

[Initial Setup]

Figure 5:
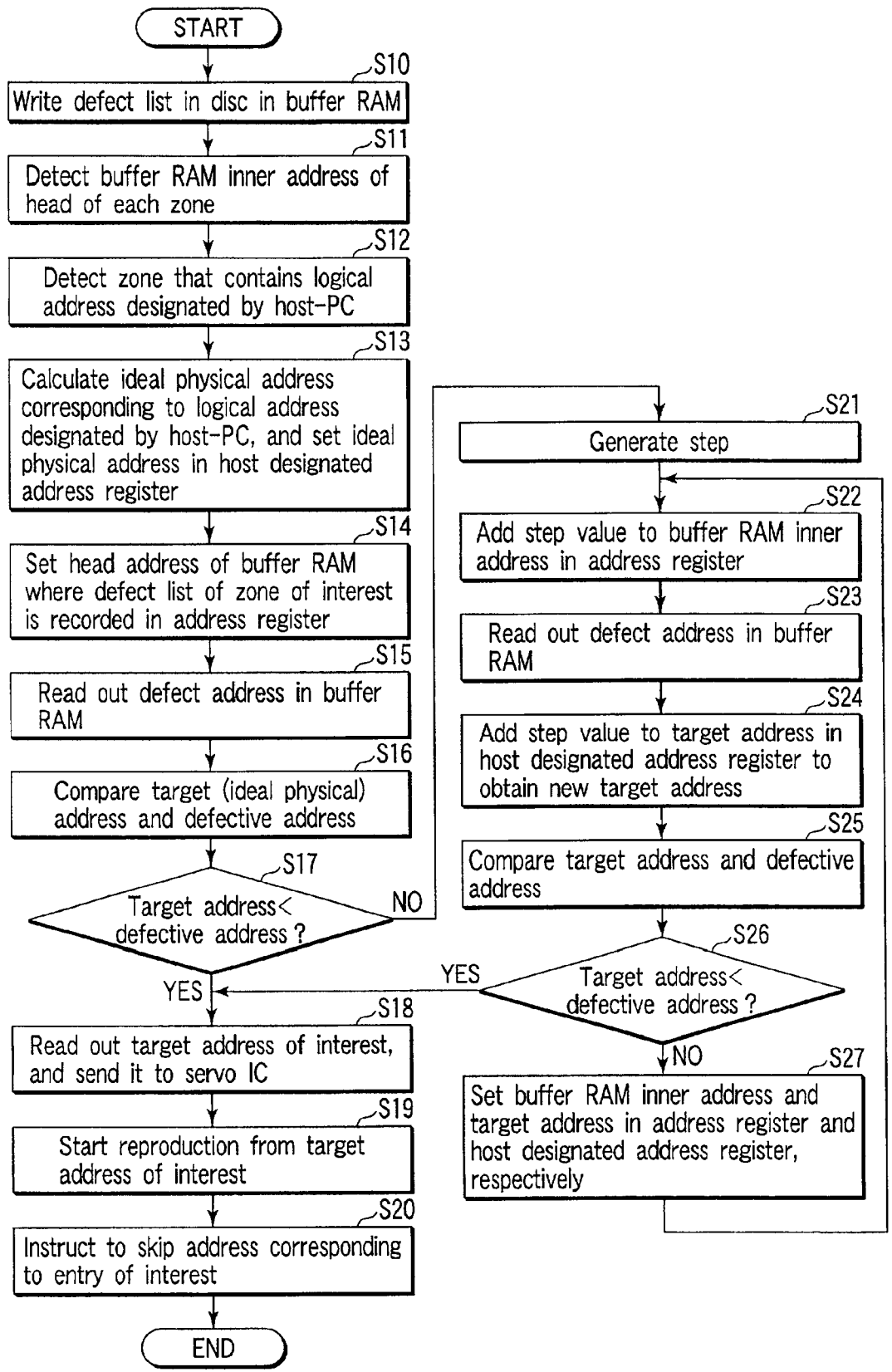
FIG. 5 is a flow chart of a method for searching for a defective address of a recording medium according to the first embodiment of the present invention.

When the disc is set in a disc reproduction/recording apparatus (DVD player), processes in steps S10 to S11 in FIG. 5 are executed as an initial setup process. This process will be explained below with reference to FIG. 2B, FIGS. 4A to 4C, and FIG. 6.

When the disc 50 is set in the DVD player, the defect list in the disc 50 is read out, and is written in the buffer RAM 41 (step S10; see FIG. 6). The defective addresses in the defect list are described using physical addresses.

The microcomputer 44 reads out the defect list written in the buffer RAM 41. The microcomputer 44 then detects the buffer RAM inner addresses where the head defective addresses of respective zones are written (step S11). As described above, the head physical addresses of the respective zones are determined in advance. Hence, the microcomputer recognizes the head defective addresses of the respective zones on the basis of the head physical addresses of the respective zones. In this embodiment, the head physical addresses of zones 0, 1, and 2 are respectively "0", "20", and "40", as shown in FIG. 4B. Hence, it is recognized that defective addresses "2", "21", and "44" in the defect list are the head defective addresses of the respective zones. The addresses in the buffer RAM 41 where defective addresses "2", "21", and "44" are written are respectively "0001", "0006", and "000C", as shown in FIG. 6. The microcomputer 44 recognizes these addresses "0001", "0006", and "000C" as the buffer RAM inner addresses of the head positions of the respective zones.

[Preparation for Reproduction]

Processes in steps S12 to S18 and steps S21 to S27 in FIG. 5 are done as preparation for reproducing the disc. This process will be explained below with reference to FIG. 2B, FIGS. 4A to 4C, FIG. 7A, and FIG. 7B.

The host-PC 60 inputs a reproduction (or recording) command and a reproduction (recording) start address (request address) to the microcomputer 44. The request address from the host-PC 60 is a logical address.

The microcomputer 44 then checks a zone to which the request address belongs (step S12). As described above, the head logical addresses of the respective zones are determined in advance. Hence, the microcomputer 44 recognizes the zone to which the request address belongs on the basis of the head logical addresses of the respective zones. In this embodiment, the head logical addresses of zones 0, 1, and 2 are respectively "0", "25", and "50", as shown in FIG. 4B. If the request logical address from the host-PC is "28", it is determined that the request address is included in zone 1.

The microcomputer 44 calculates an ideal physical address for the request logical address "28" from the host-PC 60 (step S13). The ideal physical address is a physical address which corresponds to the request logical address if the disc is free from any defects. As shown in FIG. 7A, ideal physical address is given by:

(Ideal physical address)=(head physical address of zone of interest)+(host designated logical address)−(head logical address of zone of interest)

In this embodiment, (head physical address of zone of interest)="20", (host designated logical address)="28", and (head logical address of zone of interest)="25". Hence, the ideal physical address is "23" (="20"+"28"−"25"). That is, if the zone of interest does not include any defects before the request address, a sector with physical address "23" is to be accessed.

The microcomputer 44 makes the host designated address register 71 hold ideal physical address "23" (step S13).

The microcomputer 44 recognizes the buffer RAM inner address where the head defective address of the zone of interest is recorded in the defect list recorded in the buffer RAM 41. The microcomputer 44 makes the address register 76 hold this buffer RAM inner address (step S14). In this embodiment, the zone of interest is zone 1. The buffer RAM inner address where the head defective address in zone 1 is recorded is "0006", as shown in FIG. 6. Hence, the microcomputer 44 makes the address register 76 hold buffer RAM inner address "0006".

The microcomputer 44 reads out defective address "21" recorded at buffer RAM inner address "0006" in the buffer RAM 41 from the buffer RAM 41, and makes the buffer RAM data register 74 hold this defective address "21" (step S15). Also, the microcomputer 44 makes the latch circuit 73 hold, as a target address, ideal physical address "23" held in the host designated address register 71.

The comparator 43 compares ideal physical address (target address) "23" latched by the latch circuit 73 with defective address "21" held in the buffer RAM data register 74 (step S17). This comparison result is target address "23">defective address "21".

The process in step S17 compares the physical address if the disc is free from any defects and the first defective address in the zone of interest. If there are no defects before the request address from the host-PC 60, the comparison result between these addresses should be target address (ideal physical address)<defective address. Hence, the ideal physical address is the physical address of the disc to be actually accessed.

Hence, in this case, the microcomputer 44 reads out the target address (ideal physical address) latched by the latch circuit 73. In this case, target address "23" is read out. The microcomputer 44 sends readout target address "23" to a servo IC (not shown) and commands to start reproduction from that physical address (step S18).

Conversely, if target address≧defective address, this means that at least one defect is present before the request address.

In this embodiment, target address>defective address in step S17. Hence, the next target address is set, and is compared with the next defective address.

The step generator 75 generates a step value in response to the comparison result, i.e., target address>defective address (step S21). The step value is, e.g., "1".

The step value is sent to the adder 77. The adder 77 adds buffer RAM inner address "0006" held in the address register 76 and step value "1" to generate sum address "0007". The adder 77 then outputs address "0007" to the buffer RAM 41 (step S22). In this way, since the step generator 75 generates step value "1", the buffer RAM inner address where the next defective address in the defect list is recorded can be generated. Note that this step value need not always be "1", and such case will be explained later in the second and subsequent embodiments.

The microcomputer 44 makes the buffer RAM data register 74 hold defective address "23" recorded at buffer RAM inner address "0007" in the buffer RAM 41 (step S23).

At the same time, the step generator 75 outputs the step value used to generate the buffer RAM inner address to the adder 72. In this case, the step value is "1". The adder 72 adds ideal physical address "23" held in the host designated address register 71 and this step value "1". The latch circuit 73 latches sum "24" as a target address (step S24).

The comparator 43 compares target address "24" latched by the latch circuit 73 with defective address "23" held in the buffer RAM data register 74 (step S25). Then, the comparison result is target address "24">defective address "23".

The address register 76 and host designated address register 71 respectively store buffer RAM inner address "0007" and target address "24" used in that comparison (step S27).

After that, the aforementioned process is repeated while adding the step value until target address<defective address is obtained.

That is, since target address>defective addresses, the next target address is set, and is compared with the next defective address.

The adder 77 adds step value "1" output from the step generator 75 and buffer RAM inner address "0007" in the address register 76 to obtain buffer RAM inner address "0008" (step S22). The buffer RAM data register 74 holds defective address "24" recorded at buffer RAM inner address "0008" in the buffer RAM 41 (step S23). The adder 72 adds step value "1" and target address "24" in the host designated address register 71. The latch circuit 73 latches sum "25" as a new target address (step S24). If the comparator 43 compares these addresses (step S25), since target address "25">defective address "24", the same process is further repeated (step S26).

That is, the address register 76 and host designated address register 71 respectively store buffer RAM inner address "0008" and target address "25" used in the above comparison (step S27).

The adder 77 adds step value "1" output from the step generator 75 and buffer RAM inner address "0008" in the address register 76 to obtain buffer RAM inner address "0009" (step S22). The buffer RAM data register 74 holds defective address "26" recorded at buffer RAM inner address "0009" in the buffer RAM 41 (step S23). The adder 72 adds step value "1" and target address "25" in the host designated address register 71. The latch circuit 73 latches sum "26" as a new target address (step S24). If the comparator 43 compares these addresses (step S25), since target address "26"=defective address "26", the same process is further repeated (step S26).

That is, the address register 76 and host designated address register 71 respectively store buffer RAM inner address "0009" and target address "26" used in the above comparison (step S27).

The adder 77 adds step value "1" output from the step generator 75 and buffer RAM inner address "0009" in the address register 76 to obtain buffer RAM inner address "0010" (step S22). The buffer RAM data register 74 holds defective address "28" recorded at buffer RAM inner address "0010" in the buffer RAM 41 (step S23). The adder 72 adds step value "1" and target address "26" in the host designated address register 71. The latch circuit 73 latches sum "27" as a new target address (step S24). The comparator 43 compares defective address "28" and target address "27. In this case, a condition "target address<defective address" is satisfied.

If this condition is satisfied, the microcomputer 44 reads out the target address latched by the latch circuit 73 at that time. In this case, target address "27" is read out. The microcomputer 44 sends readout target address "27" to the servo IC (step S18). That is, as can be seen from FIG. 7A, target address "27" when target address<defective address is a physical address corresponding to logical address "28" requested from the host-PC.

The above process can also be explained as follows. FIG. 7B shows the relationship between the defect list in the zone of interest and buffer RAM inner addresses. Note that the number of entries indicates the number of defects present before the defective address of interest. Since the head defective address in the defect list is the first defect in the zone of interest, the number of entries corresponding to the head defective address is "0". The subsequent number of entries increases in increments of "1" toward the last field of the list. In the method for searching for a defective address of a recording medium according to this embodiment, the ideal physical address under an assumption that there are no defects is set as the initial target address. The target address is then compared with the head defective address recorded in the buffer RAM. After that, a new target address obtained by adding a predetermined step value to the target address used in the previous comparison is compared with a defective address ahead of that step value. If target address>defective address, this means that the number of defects present before the request address is larger than the number of entries corresponding to the defective address of interest. If target address<defective address is satisfied for the first time, this means that defects, the number of which is equal to the number of entries corresponding to the defective address of interest are present. In this embodiment, a defect is searched for by increasing the step value by "1". Then, target address<defective address is satisfied only when defective address "28" is compared with the target address. That is, since the number of entries corresponding to the defective address of interest is "4", the number of defects present before the request address is four. Then, address "27" as the sum of this number of defects="4" to ideal physical address "23" is the physical address corresponding to the logical address requested by the host-PC.

Therefore, the total of the step values generated by the step generator can also be the number of entries. This is because a defective address corresponding to the step value can be accessed by adding that step value to the buffer RAM inner address.

[Reproduction]

In this manner, the reproduction start physical address in the disc is determined. Hence, the microcomputer 44 starts reproduction of the disc from target address "27" (step S19).

The microcomputer 44 then reads out the defective address corresponding to the entry of interest, and instructs the servo IC to skip that address upon reproduction (step S20). That is, the microcomputer 44 instructs the servo IC to skip defective address "28" corresponding to entry "4". This is because the first defective address detected upon reproduction starting from the reproduction start address requested from the host PC encounters is defective address "28".

With the above process, defect search of the DVD ends. One objective of defect search is to detect how many defects are present before the reproduction (or recording) start address (request address) received upon a reproduction (or recording) command from the host-PC. The request address received from the host-PC is normally described using a logical address. If the number of defects which are present before the request address can be detected, the physical address of a reproduction (or recording) start sector can be calculated by adding that number of defects to the head physical address of the zone of interest.

As described above, with the apparatus and method for searching for a defective address of a recording medium according to this embodiment, a new target address is set by adding in increments of step value "1" to the target address. Comparison between the target address and a defective address corresponding to the number of entries according to the accumulated step value is repeated until target address<defective address is satisfied. This process can also be considered as conversion of a logical address from the host-PC into a physical address. This conversion process ends when target address<defective address is satisfied. The target address obtained at the end of conversion is the converted physical address, and access to the disc can be made using that target address.

With the aforementioned method, the defect list described using physical addresses can be used without being converted into logical addresses. For this reason, the load on the firmware process can be reduced. Also, the defect list need not be rewritten from physical addresses to logical addresses. Hence, another defect list used to search for primary defects present in the spare region need not be prepared. Hence, the buffer RAM size can be reduced.

Figure 8:
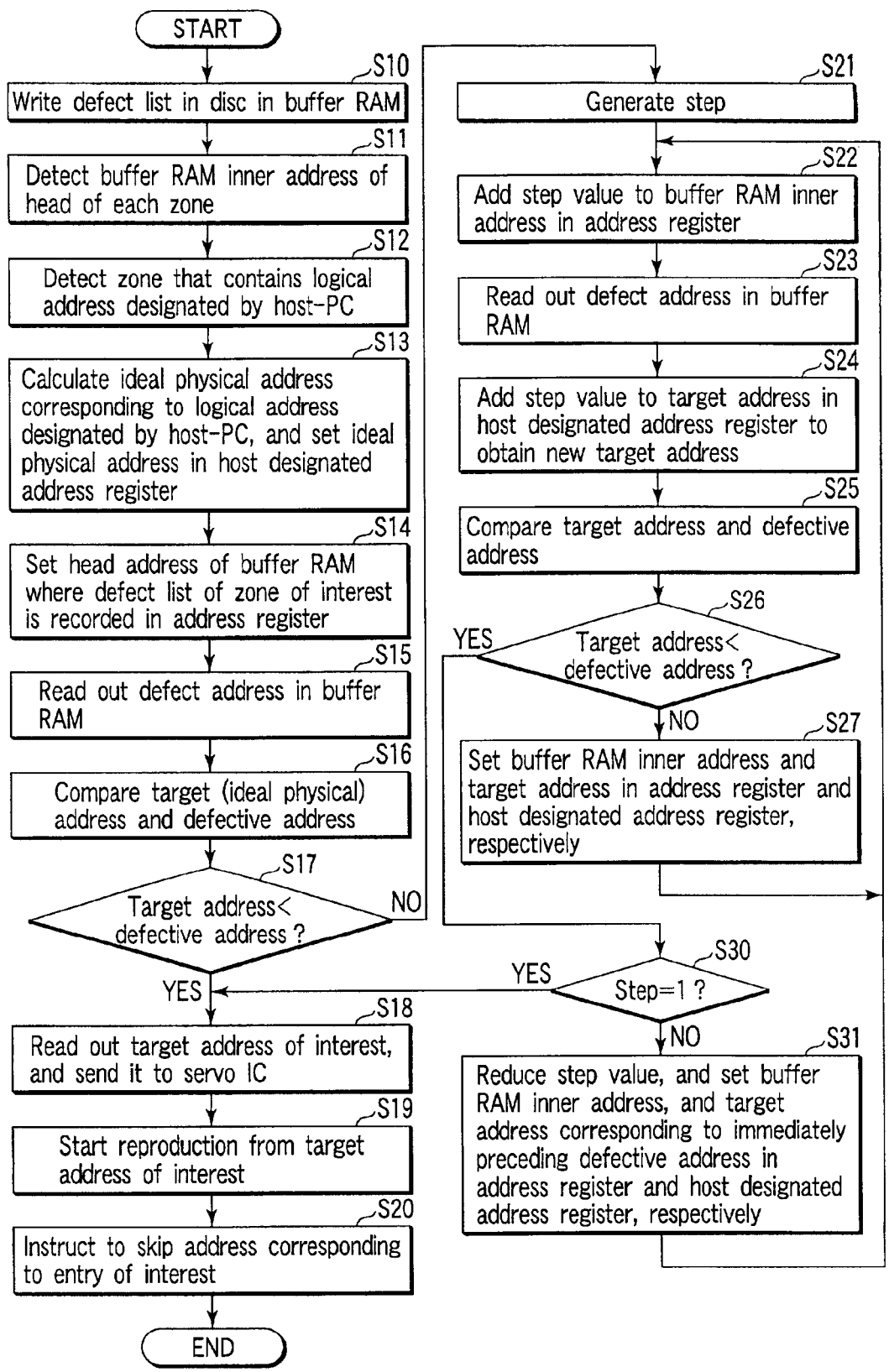
FIG. 8 is a flow chart of a method for searching for a defective address of a recording medium according to the second embodiment of the present invention.

A method for searching for a defective address of a recording medium according to the second embodiment of the present invention will be described below. FIG. 8 is a flow chart of the method for searching for a defective address of a recording medium according to this embodiment. Since a disc reproduction/recording apparatus that implements this search method is the same as the circuit shown in FIG. 2B used in the first embodiment, a description thereof will be omitted.

In this embodiment, comparison between the target address and defective address is not made while incrementing the number of entries in increments of "1" unlike in the first embodiment. That is, the final target address is detected by making comparison while halving the number of entries within a predetermined defect search range. Especially, the maximum number of defective addresses that can be stored in the defect list of the DVD of the current specifications is 7600. Therefore, the method of this embodiment is more preferable than the first embodiment that makes comparison while incrementing the number of entries in increments of "1" from the head defective address.

The method for searching for a defective address of a recording medium of this embodiment will be described below with reference to FIGS. 9A to 9J and FIG. 8. FIGS. 9A to 9J show processes in the method of comparing the target address and defective address in turn. In FIGS. 9A to 9J, numerals 0 to 1024 on the abscissa indicate the entry counts, and Sx (x: 0 to 1024) indicates a defective address corresponding to each entry.

The processes in steps S10 to S17 are executed first in the same manner as in the flow chart of FIG. 5 described in the first embodiment. That is, an ideal physical address is set to be target address "Da". Furthermore, head defective address "S0" of the zone of interest in the defect list recorded in the buffer RAM 41 is stored in the buffer RAM data register 74. The comparator 43 compares target address "Da" and defective address "S0". This comparison result is target address "Da" >defective address "S0" unless the number of defects present before target address "Da" is zero (step S17).

If target address<defective address is not satisfied, a new target address and the next defective address are compared. The new target address is obtained by adding a step value corresponding to ½ of the total number of entries (number of defects) within the defect search range to the previous target address. Also, the next defective address is corresponding to an entry count ½ the total number of entries in the defect search range. That is, the target address and defective address are compared while dividing the defect list into halves.

Figure 9A:
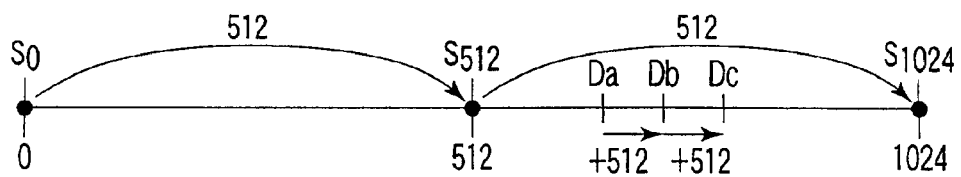
FIGS. 9A to 9J are schematic diagrams showing, in turn, steps of a method for searching for a defective address of a recording medium according to the second embodiment of the present invention.

As shown in FIG. 9A, in order to divide 1024 entries into halves, a defective address of entry count "512" is compared with a corresponding target address.

More specifically, the step generator 75 generates step value "512" in the process in step S21. Then, step value "512" is added to the buffer RAM inner address held in the address register. Furthermore, defective address "S512" recorded at the buffer RAM inner address equal to this sum (i.e., an address of a region where a defective address "512" entries ahead of the head defective address is recorded) is stored in the buffer RAM data register 74 (step S23). Needless to say, the entry count corresponding to this defective address is "512". The adder 72 adds step value "512" generated by the step generator to target address "Da" held in the host designated address register. The latch circuit 73 latches the sum as new target address "Db" (="Da"+ "512") (step S24).

The comparator 43 compares target address "Db" and defective address "S512" (step S25).

The comparison result is target address "Db">defective address "S512", as shown in FIG. 9A (step S26). Hence, a defective address "512" entries ahead of the current defective address is compared with a corresponding new target address.

The buffer RAM inner address and target address "Db" used in the comparison are respectively stored in the address register 76 and host designated address register 71 (step S27).

Step value "512" generated by the step generator 75 is added to the buffer RAM inner address stored in the address register 76. This buffer RAM inner address is an address in the buffer RAM 41 where defective address "S512" used in comparison with target address "Db" is stored. Then, defective address "S1024" recorded at a buffer RAM inner address equal to the sum of that address and step value "512" (i.e., an address of a region where a defective address "1024" entries ahead of the head defective address is recorded) is stored in the buffer RAM data register 74 (step S23). Needless to say, the entry count corresponding to this defective address is "1024". The adder 72 adds step value "512" generated by the step generator to target address "Db" held in the host designated address register. As described above, target address "Db" is one used in the immediately preceding comparison process (step S25). The latch circuit 73 latches this sum as new target address "Dc" (="Db"+ "512") (step S24).

The comparator 43 then compares target address "Dc" and defective address "S1024" (step S25).

In this case, a condition target address "Dc"<defective address "S1024" is satisfied (step S26). In this manner, since the target address is larger than defective addresses "S0" and "S512" and is smaller than "S1024", the following fact can be found. That is, the physical address of a sector corresponding to an access request from the host-PC is present within the range from defective addresses "S512" to "S1024". In other words, somewhere between 512 and 1024 defects are present before the request address.

Figure 9B:
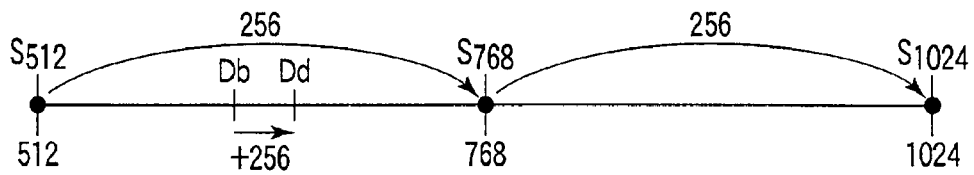

The flow advances to step S30 to check if the step value is "1". In this case, since the step value is "512", the flow advances to step S31. That is, the step value is set to be smaller than "512", and the buffer RAM inner address and target address used in comparison (step S25) immediately before target address<defective address is satisfied are respectively stored in the address register 76 and host designated address register 71. In this case, the buffer RAM inner address where defective address "S512" is recorded, and target address "Db" are stored. Storing the addresses in the address register 76 and host designated address register 71 in this processing step S31 means that a search proceeds within only an address range ahead of that address, i.e., the search range is re-set. As can be seen from the above description, the physical address corresponding to the request address is present within the range from "S512" to "S1024". Hence, a search need only be made within at least this range using a new step value. To halve the total number of entries="512" within this range, the step generator 75 generates new step value "512"/2="256". FIG. 9B shows this state.

After that, the processes in steps S22 to S27 are repeated.

Step value "256" is added to the buffer RAM inner address held in the address register 76. Defective address "S768" recorded at a buffer RAM inner address equal to this sum (i.e., a buffer RAM inner address where a defective address "768" entries ahead of the head defective address is recorded) is stored in the buffer RAM data register 74 (step S23). Needless to say, the entry count corresponding to this defective address is "768". The adder 72 adds step value "256" generated by the step generator to target address "Db" held in the host designated address register. The latch circuit 73 latches the sum as new target address "Dd" (="Db"+ "256"=ideal address "Da"+"768") (step S24).

The comparator 43 then compares target address "Dd" and defective address "S768" (step S25).

The comparison result is target address "Dd"<defective address "S768", as shown in FIG. 9B (step S26). This comparison result reveals that the physical address of a sector corresponding to the access request from the host-PC is present within the defective address range from "S512" to "S768". In other words, somewhere between 512 and 768 defects are present before the request address.

Therefore, the flow advances to step S30 to check if the step value is "1". Since the step value is "256", the flow advances to step S31. That is, the step value is set to be smaller than "256", and the buffer RAM inner address and target address used in comparison (step S25) immediately before target address<defective address is satisfied are respectively stored in the address register 76 and host designated address register 71. In this case, the buffer RAM inner address where defective address "S512" is recorded, and target address "Db" are stored.

Figure 9C:
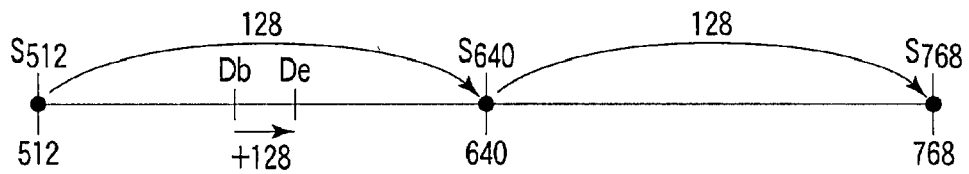

As can be seen from the above description, the physical address corresponding to the request address is present within the range from "S512" to "S768". Hence, the next search can be made within this range using a new step value. To halve the total number of entries="256" within this range, the step generator 75 generates new step value "256"/2= "128". FIG. 9C shows this state.

After that, the processes in steps S22 to S27 are repeated. Since these processes are the same as those described above, a detailed description thereof will be omitted, and only comparison results within the respective ranges will be explained.

As shown in FIG. 9C, when a search is made within the entry count range from "512" to "768" (total number of entries="256", target address "De" (="Db"+"128") "128" entries ahead of "Db"<defective address "S640". Hence, this comparison result reveals that the request address is present within the range from "S512" to "S640".

Figure 9D:
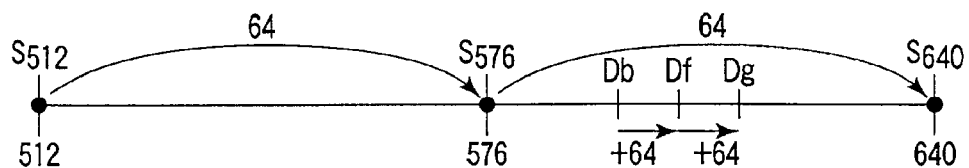

As shown in FIG. 9D, a search is made within the entry count range from "512" to "640" (the total number of entries="128"). In this case, target address "Df" (="Db"+"64") "64" entries ahead of "Db">defective address "S576". Furthermore, target address "Dg" (="De"+"64") "64" entries ahead of "Df"<defective address "S640". Hence, these comparison results reveal that the request address is present within the range from "S576" to "S640".

Figure 9E:
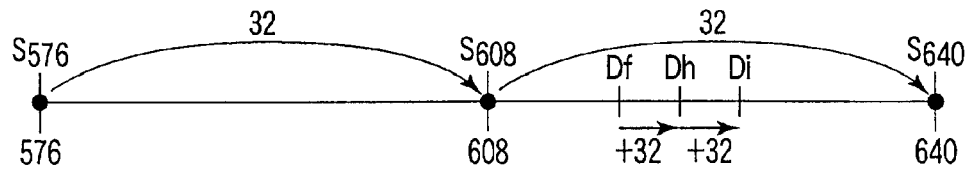

As shown in FIG. 9E, a search is made within the entry count range from "576" to "640" (the total number of entries="64"). In this case, target address "Dh" (="Df"+"32") "32" entries ahead of "Df">defective address "S608". Furthermore, target address "Di" (="Dh"+"32") "32" entries ahead of "Dh"<defective address "S640". Hence, these comparison results reveal that the request address is present within the range from "S608" to "S640".

Figure 9F:
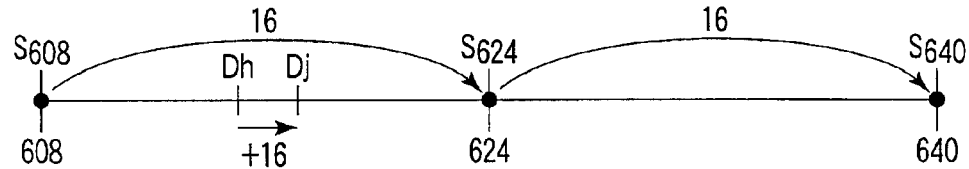

As shown in FIG. 9F, a search is made within the entry count range from "608" to "640" (the total number of entries="32"). In this case, target address "Dj" (="Dh"+"16") "16" entries ahead of "Dh"<defective address "S624". Hence, this comparison result reveals that the request address is present within the range from "S608" to "S624".

Figure 9G:
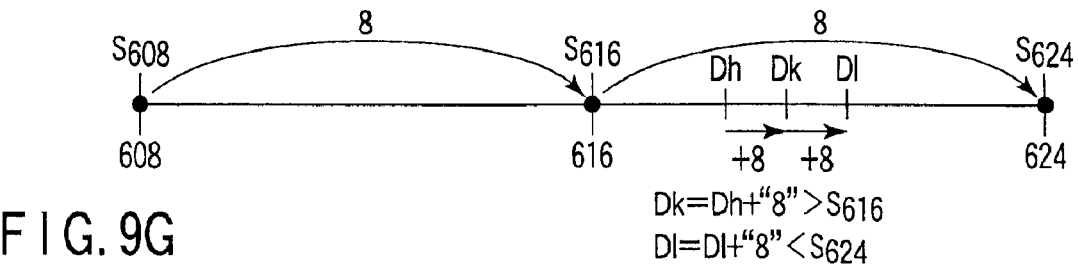

As shown in FIG. 9G, when a search is made within the entry count range from "608" to "624" (the total number of entries="16"), target address "Dk" (="Dh"+"8") "8" entries ahead of "Dh">defective address "S616". Furthermore, target address "Dl" (="Dk"+"8") "8" entries ahead of "Dk"<defective address "S624". Hence, these comparison results reveal that the request address is present within the range from "S616" to "S624".

Figure 9H:
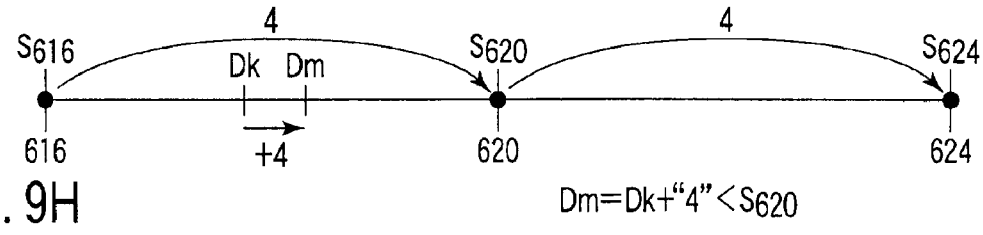

As shown in FIG. 9H, when a search is made within the entry count range from "616" to "624" (the total number of entries="8"), target address "Dm" (="Dk"+"4") "4" entries ahead of "Dk"<defective address "S620". Hence, this comparison result reveals that the request address is present within the range from "S616" to "S620".

Figure 9I:
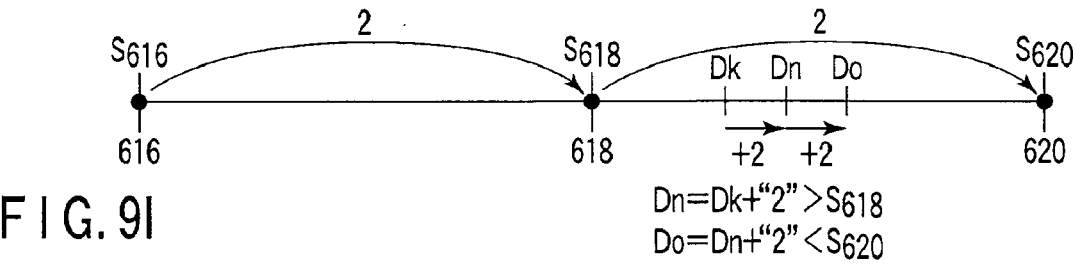

As shown in FIG. 9I, when a search is made within the entry count range from "616" to "620" (the total number of entries="4"), target address "Dn" (="Dk"+"2") "2" entries ahead of "Dk">defective address "S618". Furthermore, target address "Do" (="Dn"+"2") "2" entries ahead of "Dn"<defective address "S620". Hence, these comparison results reveal that the request address is present within the range from "S618" to "S620".

Figure 9J:
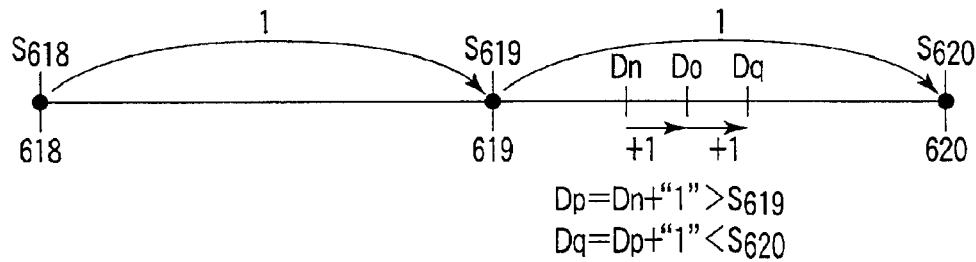
Figure 10:
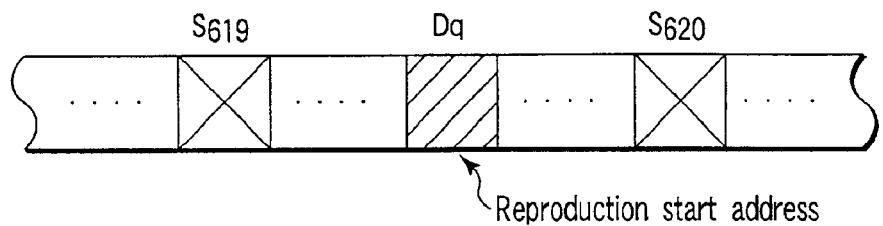
FIG. 10 is a schematic diagram of a memory space of a DVD.

As shown in FIG. 9J, when a search is made within the entry count range from "618" to "620" (the total number of entries="2"), target address "Dp" (="Dn"+"1") "1" entry ahead of "Dn">defective address "S619". Furthermore, target address "Dq" (="Dp"+"1") "1" entry ahead of "Dp"<defective address "S620". Hence, these comparison results reveal that the request address is present within the range from "S619" to "S620".

After the last process, since the step value becomes "1", the flow advances to the process in step S18. In the process in step S18, the microcomputer 44 reads out the target address, and sends that target address to the servo IC that outputs a drive command to the disc. More specifically, the target address that satisfies target address<defective address when the step value="1" corresponds to a physical address of the disc corresponding to the request address from the host-PC. In this case, target address "Dq" is set to be the reproduction start physical address, and sectors with physical addresses "S619" and "S620" before and after that address suffer defects.

After that, reproduction starts from target address "Dq" latched by the latch circuit 73 (step S19) as in the first embodiment. The microcomputer 44 reads out entry count "620", and instructs the servo IC to skip that address upon reproduction (step S20). More specifically, the microcomputer 44 instructs the servo IC to skip defective address "S620" corresponding to entry count "620". This is because the first defective address detected upon reproduction starting from the reproduction start address requested from the host-PC encounters is that defective address "S620".

With the above process, defect search of the disc ends.

As described above, with the apparatus and method for searching for a defective address of a recording medium according to this embodiment, since a new target address is set by adding a given step value, which is equal to ½ the total number of entries, to the target address, and comparison between this target address and a defective address of the corresponding entry count is repeated until target address<defective address is satisfied. If this condition is satisfied, it is checked if the step value is "1". If the step value is larger than "1", the total number of entries is limited to a range from the entry count corresponding to the defective address immediately before target address>defective address is satisfied to the entry count corresponding to the defective address when target address>defective address is satisfied, and a step value which is equal to ½ of this total number of entries is set. Comparison between the target address and a defective address corresponding to the entry count is repeated. When the step value is "1" and target address>defective address is satisfied, conversion of the request logical address from the host-PC into a physical address ends, and that target address is set to be a reproduction start physical address.

With the aforementioned method for searching for a defective address of a recording medium, the same effects as in the first embodiment can be obtained. When the number of entries in the defect list is very large or when the reproduction start address is present in the latter half of the defect list, the defect search speed can be improved compared to the method described in the first embodiment.

The method of detecting the final target address by repeating comparison while halving the defect list in turn as in the second embodiment will be described in more detail as the third embodiment.

A method for searching for a defective address of a recording medium according to the third embodiment of the present invention will be described below using FIG. 11, and FIGS. 12A to 12E. FIG. 11 shows a defect list, and FIGS. 12A to 12E show processes in the method of comparing the target address and defective address.

As shown in FIG. 11, the defect list includes entry counts and defective addresses (physical addresses) corresponding to the entry counts. Assume that the head physical address of the zone of interest is "0", the head logical address is "10", and the request logical address from the host-PC is "130".

An ideal physical address of the request logical address from the host-PC is calculated. As described above, the ideal physical address can be calculated by (head physical address)+(host requested logical address)−(head logical address). Hence, the ideal physical address="120". This ideal physical address "120" is stored in the host designated address register 71.

The latch circuit 73 latches ideal physical address "120" as target address "Da". The comparator 43 compares target address "Da" and defective address "2" corresponding to entry count "0". Of course, target address "Da" ="120">defective address "2".

Figure 12A:
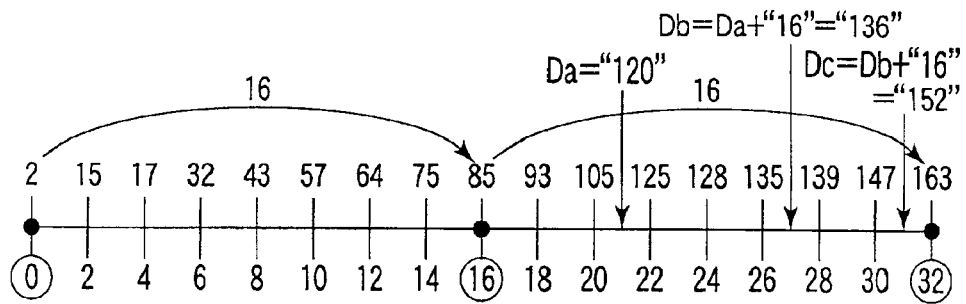
FIGS. 12A to 12E are schematic diagrams showing, in turn, steps of the method for searching for a defective address of a recording medium according to the third embodiment of the present invention.

As shown in FIG. 12A, the step generator 75 generates step value "16" to divide the entry count range "0" to "32" into two 16-entry ranges. The adder 77 adds step value "16" to a buffer RAM inner address where defective address "2" is recorded in the buffer RAM. Then, a defective address "16" steps ahead of the head defective address, i.e., defective address "85" corresponding to entry count "16" is read out by accessing the buffer RAM inner address equal to the sum in the buffer RAM, and is stored in the buffer RAM data register 74. The adder 72 adds target address "Da" stored in the host designated address register 71 and step value "16", and the latch circuit 73 latches the sum as new target address "Db" (="Da"+"16"="136"). The comparator 43 compares defective address "85" (entry count "16") 16 entries ahead of the head defective address and target address "Db". As a result, target address "Db"="136">defective address "85". Then, the target address is set to be "Dc" (="Db"+"16"= "152") another 16 entries ahead of target address "Db", and is compared with defective address "163" (entry count "32") 16 entries ahead of defective address "85". As a result, target address "Dc"="152"<defective address "163". That is, these comparison results reveal that the physical address of a sector requested from the host-PC is present within the range from "85" to "163" (entry counts "16" to "32").

Figure 12B:
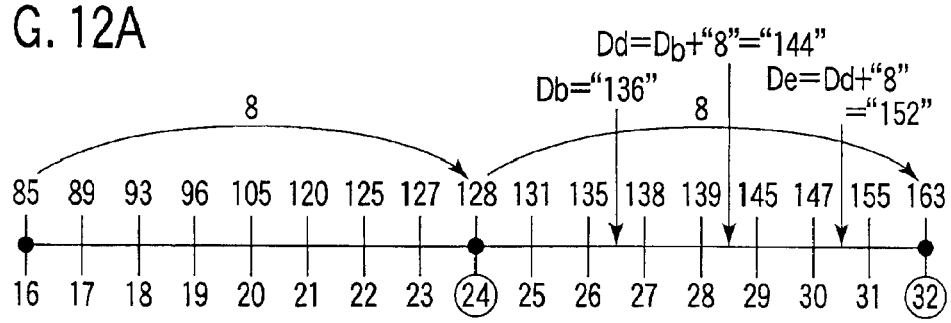

As shown in FIG. 12B, the entry count range from "16" to "32" is divided into two 8-entry ranges. The target address is set to be "Dd" (="Db"+"8"="144"). Target address "Dd" is compared with defective address "128" (entry count "24") 8 entries ahead of head defective address "85" of the defect search range of interest. As a result, target address "Dd"= "144">defective address "128". Then, the target address is set to be "De" (="Dd"+"8"="152"), and is compared with defective address "163" (entry count "32") another 8 entries ahead of defective address "128". As a result, target address "De"="152"<defective address "163". That is, these comparison results reveal that the physical address of a sector requested from the host-PC is present within the range from "128" to "163" (entry counts "24" to "32").

Figure 12C:
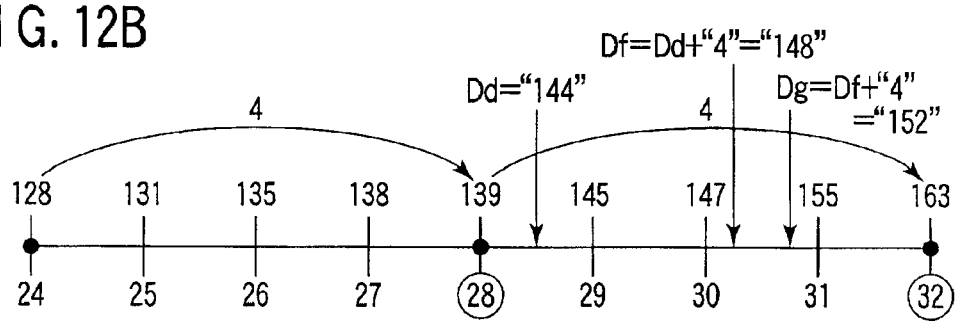

As shown in FIG. 12C, the entry count range from "24" to "32" is divided into two 4-entry ranges. The target address is set to be "Df" (="Dd"+"4"="148"). Target address "Df" is compared with defective address "139" (entry count "28") 4 entries ahead of head defective address "128" of the defect search range of interest. As a result, target address "Df"= "148">defective address "139". Then, the target address is set to be "Dg" (="Df"+"4"="152"), and is compared with defective address "163" (entry count "32") another 4 entries ahead of defective address "139". As a result, target address "Dg"="152"<defective address "163". That is, these comparison results reveal that the physical address of a sector requested from the host-PC is present within the range from "139" to "163" (entry counts "28" to "32").

Figure 12D:
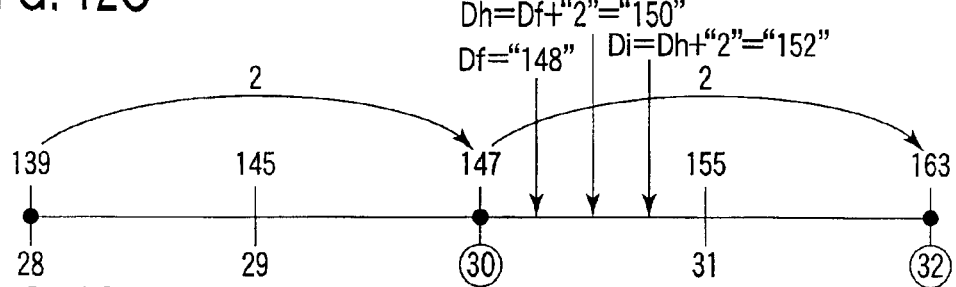

As shown in FIG. 12D, the entry count range from "28" to "32" is divided into two 2-entry ranges. The target address is set to be "Dh" (="Dd"+"2"="150"). Target address "Dh" is compared with defective address "147" (entry count "30") 2 entries ahead of head defective address "139" of the defect search range of interest. As a result, target address "Dh"= "150">defective address "147". Then, the target address is set to be "Di" (="Dh"+"2"="152"), and is compared with defective address "163" (entry count "32") another 2 entries ahead of defective address "147". As a result, target address "Di"="152"<defective address "163". That is, these comparison results reveal that the physical address of a sector requested from the host-PC is present within the range from "147" to "163" (entry counts "30" to "32").

Figure 12E:
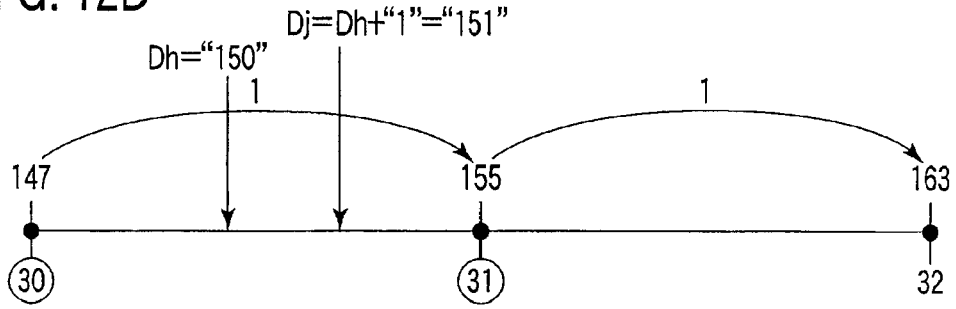

As shown in FIG. 12E, the entry count range from "30" to "32" is divided into two 1-entry ranges. The target address is set to be "Dj" (="Dh"+"1"="151"). Target address "Dj" is compared with defective address "155" (entry count "31") 1 entry ahead of head defective address "147" of the defect search range of interest. As a result, target address "Dj"= "151"<defective address "155". That is, this comparison result reveals that the physical address of a sector requested from the host-PC is present within the range from "147" to "155" (entry counts "30" and "31").

Figure 13:
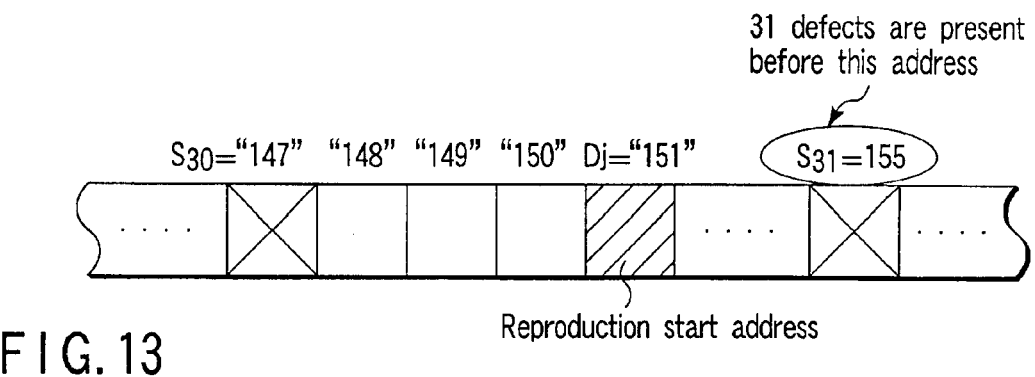
FIG. 13 is a schematic diagram of a memory space of a DVD.

Since the step value becomes "1", target address "Dj"= "151" that satisfies target address<defective address is a physical address of the disc corresponding to the request address from the host-PC. That is, as shown in FIG. 13, target address "Dj"="151" is set as a reproduction start physical address, and sectors with physical addresses "147" and "155" before and after that address suffer defects. Hence, a sector with physical address "155" four sectors ahead of the reproduction start sector is skipped upon reproduction.

The second and third embodiments have explained the method of detecting the final target address by repeating comparison while halving the defect list into halves in turn. Other methods for searching for a defective address of a recording medium will be explained in the following fourth and fifth embodiments.

A method for searching for a defective address of a recording medium according to the fourth embodiment of the present invention will be described below using FIGS. 14A to 14D. FIGS. 14A to 14D show processes in the method of comparing the target address and defective address in turn. In FIGS. 14A to 14D, numerals 0 to 4096 on the abscissa indicate the entry counts, and Sx (x: 0 to 4096) indicates a defective address corresponding to each entry. Since a defect search circuit that implements this search method is the same as the circuit shown in FIG. 2B used in the first embodiment, a description thereof will be omitted. Also, the flow chart of the method for searching for a defective address of a recording medium in this embodiment is the same as that in FIG. 8 explained in the second embodiment.

In this embodiment, the target address and defective address are compared while dividing the defect list in units of a fixed number of entries. By setting a smaller entry unit, the final target address is detected. Since this embodiment adopts the second and third embodiments by changing the step width, a brief explanation will be given below.

The processes in steps S10 to S17 are executed first as in the second embodiment.

If target address (ideal physical address)>defective address "S0", the step value is set to be "512", and the target address and defective address are compared in turn. Step value "512" has a meaning to equally divide the total number of entries "4096" into eight equal ranges.

Figure 14A:
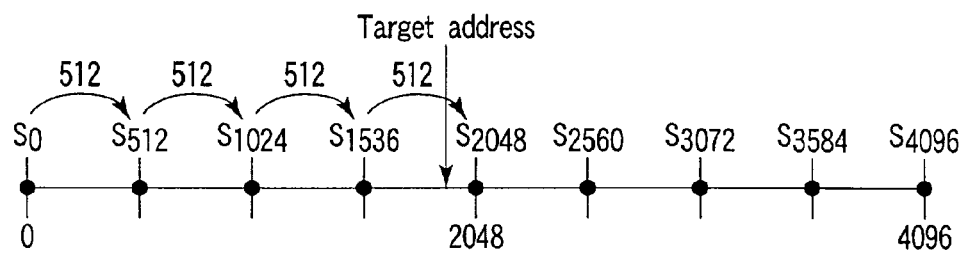
FIGS. 14A to 14D are schematic diagrams showing, in turn, steps of a method for searching for a defective address of a recording medium according to the fourth embodiment of the present invention.

Assume that the comparison results reveal that the request address is present within the range from "S1536" to "S2048" (entry counts "1536" to "2048"), as shown in FIG. 14A.

In such case, a defect search is made within the range of defective addresses "S1536" to "S2048". In this search, a smaller step value is set. For example, the step value is set to be "64". Then, the target address and defective address are compared in turn. This step value "64" has a meaning to divide the total number of entries "512" into eight equal ranges.

Figure 14B:
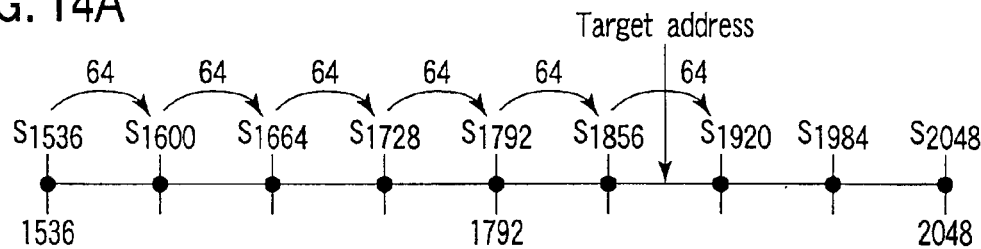

Assume that the comparison results reveal that the request address is present within the range from "S1856" to "S1920" (entry counts "1856" to "1920"), as shown in FIG. 14B.

Subsequently, the target address and defective address are compared in turn by setting step value "8" within the range of defective addresses "S1856" to "S1920" (entry counts "1856" to "1920"). This step value "8" has a meaning to divide the total number of entries "64" into eight equal ranges.

Figure 14C:
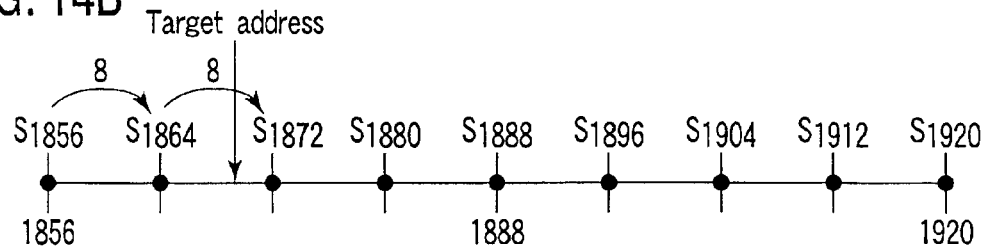

Assume that the comparison results reveal that the request address is present within the range from "S1864" to "S1872" (entry counts "1864" to "1872"), as shown in FIG. 14C.

Then, the target address and defective address are compared in turn by setting step value "1" within the range of defective addresses "S1864" to "S1872" (entry counts "1864" to "1872"). This step value "1" has a meaning to divide the total number of entries "8" into eight equal ranges.

Figure 14D:
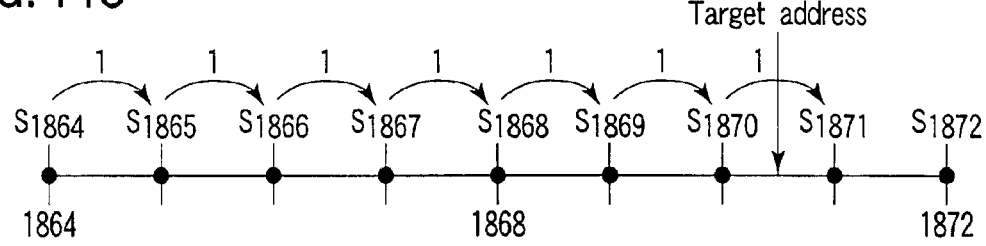

Assume that the comparison results reveal that the request address is present within the range from "S1870" to "S1871" (entry counts "1870" to "1871"), as shown in FIG. 14D.

Since the step value is "1" in the process of FIG. 14D, the target address that finally satisfies target address<defective addresses is set to be a reproduction start physical address.

With the above method as well, defect search that can reduce the load on firmware can be made.

The fifth embodiment will be described as a more detailed embodiment of the fourth embodiment.

Figure 15A:
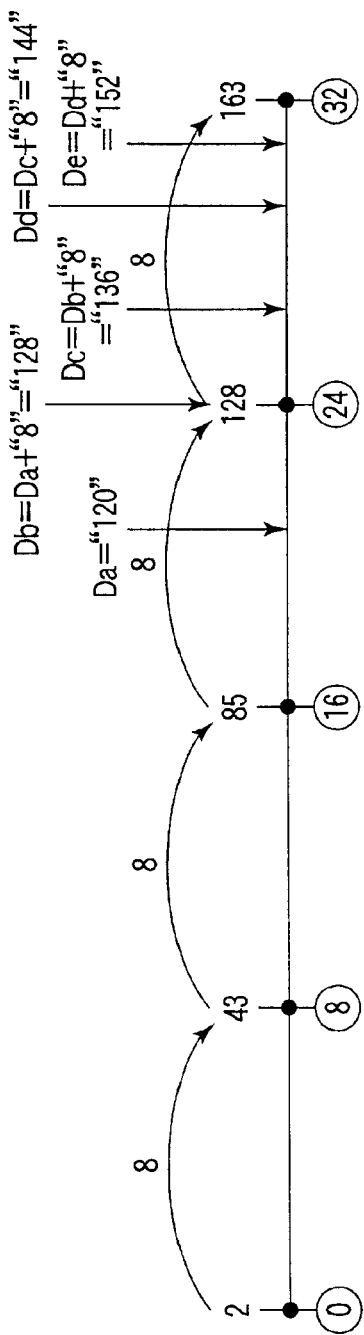
FIGS. 15A to 15C are schematic diagrams showing, in turn, steps of a method for searching for a defective address of a recording medium according to the fifth embodiment of the present invention.
Figure 15B:
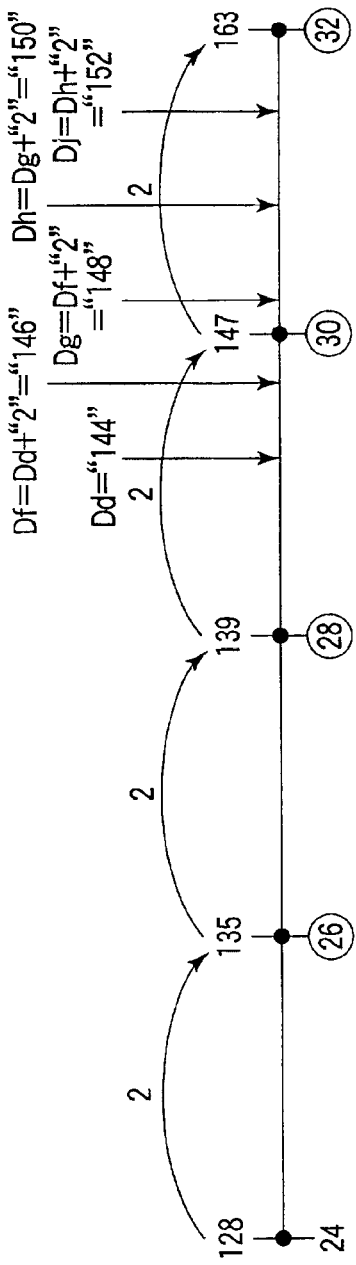
Figure 15C:
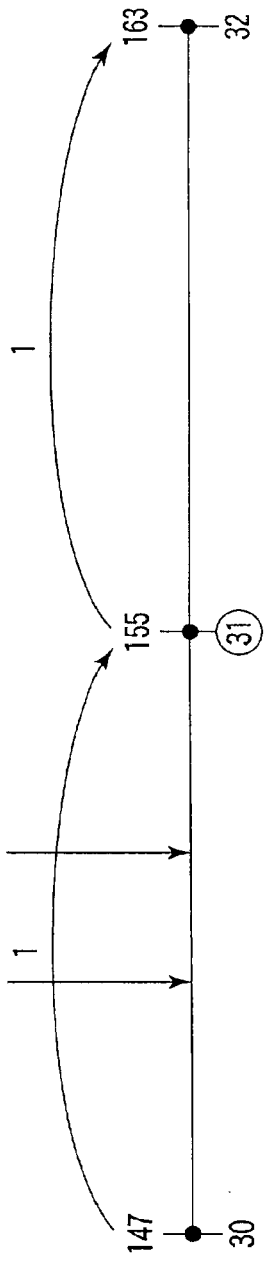

A method for searching for a defective address of a recording medium according to the fifth embodiment of the present invention will be described below using FIG. 13 and FIGS. 15A to 15C. FIGS. 15A to 15C show processes in the method of comparing the target address and defective address in turn. Note that FIG. 13 shows a defect list which is also used in the third embodiment.

Ideal physical address "120" is set to be target address "Da". Target address "Da" is compared with defective address "2" corresponding to entry count "0". The comparison result is "Da"="120">defective address "2".

Then, entry counts "0" to "32" are divided to, e.g., four 8-entry ranges. The target address is set to be "Db" (="Da"+"8"="128"). Target address "Db" is compared with defective address "43" (entry count "8") 8 entries ahead of the head defective address. As a result, target address "Db"="128">defective address "43". Then, the target address is set to be "Dc" (="Db"+"8"="136"), and is compared with defective address "85" (entry count "16") another 8 entries ahead of defective address "43". As a result, target address "Dc"="136">defective address "85". The target address is set to be "Dd" (="Dc"+"8"="144"), and is compared with defective address "128" (entry count "24") another 8 entries ahead of defective address "85". As a result, target address "Dd"="144">defective address "128". Then, the target address is set to be "De" (="Dd"+"8"="152"), and is compared with defective address "163" (entry count "32) another 8 entries ahead of defective address "128". As a result, target address "De"="152"<defective address "163".

That is, these comparison results reveal that the physical address of a sector corresponding to an access request from the host-PC is present within the range from "128" to "163" (entry counts "24" to "32").

Subsequently, the entry count range from "24" to "32" is divided into four 2-entry ranges. The target address is set to be "Df" (="De"+"2"="146"). Target address "Df" is compared with defective address "135" (entry count "26") 2 entries ahead of head defective address "128" of the defect search range of interest. As a result, target address "Df"="146">defective address "135". Then, the target address is set to be "Dg" (="Df"+"2"="148"), and is compared with defective address "139" (entry count "28") another 2 entries ahead of defective address "135". As a result, target address "Dg"="148">defective address "139". Then, the target address is set to be "Dh" (="Dg"+"2"="150"), and is compared with defective address "147" (entry count "30") 2 entries ahead of defective address "139". As a result, target address "Dh"="150">defective address "147". Then, the target address is set to be "Di" (–"Dh"+"2"="152"), and is compared with defective address "163" (entry count "32") 2 entries ahead of defective address "147". As a result, target address "Di"="152">defective address "163".

That is, these comparison results reveal that the physical address of a sector corresponding to an access request from the host-PC is present within the range from "147" to "163" (entry counts "30" to "32").

The entry count range from "30" to "32" is divided into two 1-entry ranges. The target address is set to be "Dj" (="Dh"+"1"="151"). Target address "Dj" is compared with defective address "155" (entry count "31") 1 entry ahead of head defective address "147" of the defect search range of interest. As a result, target address "Dj"="151"<defective address "155". That is, this comparison result reveals that the physical address of a sector corresponding to an access request from the host-PC is present within the range from "147" to "155" (entry counts "30" to "31").

Since the step value becomes "1", target address "Dj"="151" that satisfies target address<defective address is a physical address requested by the host-PC. That is, target address "Dj"="151" is set as a reproduction start physical address, and sectors with physical addresses "147" and "155" before and after that address suffer defects. Hence, a sector with physical address "155" four sectors ahead of the reproduction start sector is skipped upon reproduction.

As described in the fourth and fifth embodiments, the method for searching for a defective address of a recording medium, which compares data by dividing the defect list into ranges with a fixed step width="8", "2", "1", and the like, and sets a smaller step width in turn can be used.

With the method for searching for a defective address of a recording medium using the defect search circuit according to each of the first to fifth embodiments, the defect list described using physical address can be used without being converted into logical addresses. For this reason, the processing load on firmware can be reduced. Also, the defect list of physical addresses is not rewritten to logical addresses.

For this reason, another defect list used to search for primary defects present in a blocks replaced due to secondary defects need not be prepared. Therefore, the buffer RAM size can be reduced. Furthermore, the method for searching for a defective address of a recording medium according to each embodiment can be easily implemented by adding only the latch circuit 73 and adder 72 to a conventional apparatus for searching for a defective address of a recording medium. Note that the adder 77 may be commonly used as the adder 72. That is, the adder 72 need not be separately added, and the adder 77 may alternately execute functions of the adders 77 and 72. FIG. 16 is a block diagram of a disc reproduction/recording apparatus in which the adder 77 is also provided with a function of the adder 72. As shown in FIG. 16, the adder 77 adds a buffer RAM inner address stored in the address register, and a step value generated by the step generator. In addition, the adder 77 adds a target address stored in the host designated address register, and the step value generated by the step generator. The target address added with the step value by the adder 77 is latched by the latch circuit 73. With this arrangement, the number of components to be added to the conventional circuit can be reduced, and each of the above embodiments can be implemented with lower cost.

In each of the above embodiments, an entry count is added in turn to the request address received from the host-PC. The sum is compared with a defective address corresponding to that entry count to find the number of defects present before the request address. As examples of such method, a method of dividing the defect list into halves in turn and a method of dividing the defect list in units of a fixed number of steps may be used. However, the embodiment of the present invention is not limited to such specific division methods, and various modifications may be made.

In the method for searching for a defective address of a recording medium described in each of the first to fifth embodiments, the ideal physical address is compared with the head defective address first (the processes in steps S15 to S17 in the flow chart shown in FIG. 5 or 8). However, such process is not always required, and may be omitted in some cases. That is, a target address may be generated by adding a predetermined step value to the ideal physical address without comparing the ideal physical address with the head defective address, and may be compared with a defective address corresponding to an entry count equal to that step value. In this case, if target address<defective address, the next search can be made within the range from entry count "0" to the entry count equal to the step value. Conversely, if target address>defective address, the next search can be made within the range from the entry count equal to the step value to another entry count ahead of the former entry count.

In each of the above embodiment, every time the comparison process (steps S26 and S30) of the flow chart shown in FIG. 5 or 8 is executed, the contents of the address 71 register 76 and host designated address register are rewritten. For example, a case will be examined below wherein the step generator generates step value "512" and comparison is made. In such case, if target address<defective address is not satisfied, the contents of the address register are rewritten by the buffer RAM inner address where the defective address of interest is recorded, and the contents of the host designated address register are rewritten by that defective address in step S27. However, the contents of the address register and host designated address register may be respectively fixed to the head buffer RAM inner address and ideal physical address. This is because the step value used so far in comparison is used as an offset to cope with such case. More specifically, assume that target address<defective address is satisfied when comparison is made using step value "512". In the method according to the above embodiment, the contents of the registers are rewritten, and step value "512" is added to the addresses in the registers again. Instead, step value "512" used in immediately preceding comparison may be used as an offset, and the step generator may generate step value "1024". With this method as well, a defective address "1024" entries ahead of the head defective address can be compared with the corresponding target address. The same applies to the process in step S31.

In the above embodiments, a DVD-RAM disc having a capacity of 2.6 Gbytes per side has been exemplified, but the embodiment of the invention can be applied to a DVD-RAM disc having a capacity of 4.7 Gbytes per side. In the DVD-RAM disc having a capacity of 4.7 Gbytes, spare regions are assured not for respective zones but for only the first and last zones. The method for searching for a defective address according to the above embodiments of the invention can also be applied to the DVD-RAM disc with such memory space.

Furthermore, the above embodiment of the invention can be applied to all other systems that access a recording medium having a defect list, which is described using physical addresses, by logical addresses, in addition to the DVD. For example, the embodiments of the present invention can be applied to all kinds of optical disc memory that repeatedly record and reproduce.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for searching for defective address of recording medium, comprising:

a recording unit configured to record a defect list recorded on an recording medium using a physical address, said defect list including defective addresses indicating addresses of defects present in the recording medium, and the defective addresses being described using physical addresses;

a converter configured to convert a request address received in an access command to the recording medium from a logical address into a physical address; and a comparator configured to compare the defective address in the defect list recorded in said recording unit and the request address that has been converted into the physical address, the defective address present immediately after said request address being searched based on a comparison result in said comparator.

2. The apparatus according to claim 1, wherein said converter comprises:

a first address register configured to hold a target address generated based on the request address received in the access command to the recording medium, said request address being described using a logical address;

a second address register configured to hold a recording unit inner address indicating an address of a region in said recording unit where the defect list is recorded;

a step generator configured to generate a step value;

an adder configured to add the step value to the target address and the recording unit inner address; and a processor configured to command said adder to repeat addition of the step value to the target address and the recording unit inner address, and command said comparator to compare the target address and the defective address until the defective address exceeds the target address, to command said step generator to sequentially reduce the step value when the defective address has exceeded the target address, and to issue an access command to the target address added with the step value in the recording medium when the step value is equal to a predetermined value and when the defective address has exceeded the target address, and said comparator compares the target address added with the step value, and the defective address which is stored at the recording unit inner address added with the step value in said recording unit.

3. The apparatus according to claim 2, wherein said adder includes first and second adders, said first adder adds the target address and the step value, and said second adder adds the recording unit inner address and the step value.

4. A semiconductor integrated circuit comprising:

a first address register configured to hold a target address generated based on a request address received in an access command to an recording medium, said request address being described using a logical address;

a second address register configured to hold a recording unit inner address indicating an address of a region in a recording unit where the defect list is recorded, said recording unit configured to record the defect list recorded in the recording medium using a physical address, said defect list including defective addresses indicating addresses of defects present in the recording medium, and the defective addresses being described using physical addresses;

a step generator configured to generate a step value;

an adder configured to add the step value to the target address and the recording unit inner address; and a comparator configured to compare the target address added with the step value, and the defective address stored at the recording unit inner address added with the step value in said recording unit.

5. The circuit according to claim 4, wherein said adder includes first and second adders, said first adder adds the target address and the step value, and said second adder adds the recording unit inner address and the step value.

6. A method for searching for defective address of recording medium, comprising:

converting a request address received in an access command to an recording medium from a logical address into a physical address;

comparing the request address that has been converted into the physical address with a defective address included in a defect list recorded in the recording medium, said defective address being described using a physical address; and searching for a defective address present immediately after the request address on the basis of a comparison result between the request address and the defective address.

7. A method for searching for defective address of recording medium, comprising:

setting a memory region including a given number of defects in a defect list recorded in an recording medium as a defect search range, said memory region including a request address received in an access command to the recording medium;

repeating comparison between a target address and a defective address until the defective address exceeds the target address, said target address being obtained by adding a given step value to a reference address corresponding to the request address, and said defective address being an address of a defect present the number of defects corresponding to the step value ahead of a head defect in the defect search range;

checking, when the defective address has exceeded the target address, if the step value is larger than 1;

sequentially reducing, when the step value is larger than 1, the step value, re-setting the defect search range, and returning to repeating comparison between the target address and defective address, said re-set defect search range being a memory space from a defective address immediately before the target address is exceeded to a defective address that has exceeded the target address; and determining, when the step value is 1, the number of defective addresses present before the defective address that has exceeded the target address in the defect list as the number of defects present before the request address.

8. A method for searching for defective address of recording medium, comprising:

recording a defect list, which is recorded in an recording medium, in a recording unit using physical addresses, said defect list including defective addresses indicating addresses of defects present in the recording medium, and the defective addresses being described using physical addresses;

calculating an ideal physical address of a request address received in an access command to the recording medium, said request address being described using a logical address;

holding the ideal physical address in a first address register as a target address;

holding a recording unit inner address in a second address register, said recording unit inner address being an address in a recording unit, where a head defective address in a memory space that includes the request address is recorded in the recording medium;

generating a step value;

adding the step value to the target address and the recording unit inner address respectively held in the first and second address registers;

comparing the target address added with the step value and the defective address held at the recording unit inner address added with the step value in the recording unit;

holding, when the target address has exceeded the defective address as a result of comparison between the target address and defective address, the target address and the recording unit inner address where the defective address is recorded in the first and second address registers, and returning to adding the step value to the target address and the recording unit inner address;

checking, when the defective address has exceeded the target address, if the step value is larger than 1;

sequentially reducing, when the step value is larger than 1, the step value to be generated by a step generator, holding the target address immediately before the defective address exceeds the target address, and the recording unit inner address where the defective address is recorded in the first and second address registers, and returning to adding the step value to the target address and the recording unit inner address; and determining, when the step value is 1, the number of defective addresses present before the defective address that has exceeded the target address in the defect list as the number of defects present before the request address.

9. The method according to claim 8, further comprising:

reading out the target address from the first address register after the number of defective addresses is determined as the number of defects; and accessing the recording medium using the readout target address as a physical address corresponding to the request address to start one of reproduction and recording of the recording medium.

10. The method according to claim 8, wherein the step value to be generated by the step generator is a fixed value.

11. The method according to claim 8, wherein the step generator generates a step value that changes the number of defects to a half, said defects being included in a memory space located between a defective address that has exceeded the target address and the defective address that is recorded at the recording unit inner address held in the second address register.

12. The method according to claim 8, further comprising:

comparing the head defective address and the ideal physical address after the recording unit inner address is held in the second address register;

advancing, when the head defective address has exceeded the ideal physical address, to determining the number of defects; and advancing, when the ideal physical address has exceeded the head defective address, to generating the step value.

13. The method according to claim 8, wherein the recording medium is a Digital Versatile Disc.

* * * * *